(12) United States Patent
Sullivan et al.

(10) Patent No.: US 10,689,059 B2
(45) Date of Patent: Jun. 23, 2020

(54) CONTROL DEVICES FOR OPERATING BICYCLE COMPONENTS

(71) Applicant: SRAM, LLC, Chicago, IL (US)

(72) Inventors: Devon Sullivan, Woodland Park, CO (US); Michael Van Zyl, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 15/950,891

(22) Filed: Apr. 11, 2018

(65) Prior Publication Data

US 2019/0315428 A1 Oct. 17, 2019

(51) Int. Cl.
| | |
|---|---|
| *B62K 21/26* | (2006.01) |
| *B62K 23/06* | (2006.01) |
| *B62M 25/04* | (2006.01) |
| *B62K 23/04* | (2006.01) |
| *G05G 1/08* | (2006.01) |
| *G05G 5/06* | (2006.01) |
| *B62K 25/04* | (2006.01) |

(52) U.S. Cl.
CPC .............. *B62K 21/26* (2013.01); *B62K 23/04* (2013.01); *B62K 23/06* (2013.01); *B62M 25/04* (2013.01); *B62K 2025/047* (2013.01); *G05G 1/082* (2013.01); *G05G 5/065* (2013.01); *Y10T 74/2011* (2015.01); *Y10T 74/20438* (2015.01); *Y10T 74/20636* (2015.01)

(58) Field of Classification Search
CPC ........ B62K 21/26; B62K 23/04; B62K 23/06; B62K 2025/047; B62K 2025/048; B62M 25/04; Y10T 74/20438; Y10T 74/20287; Y10T 74/2042; Y10T 74/20636; Y10T 74/2011; Y10T 74/20116; Y10T 74/20128; G05G 1/082; G05G 5/065
See application file for complete search history.

(56) References Cited

U.S. PATENT DOCUMENTS

| | | | |
|---|---|---|---|
| 5,476,019 A | 12/1995 | Cheever et al. | |
| 6,389,929 B1 | 5/2002 | Calilung et al. | |
| 6,729,203 B2* | 5/2004 | Wesling | B62K 23/04 74/473.14 |
| 6,767,024 B1* | 7/2004 | Kuo | B62K 25/08 188/285 |

(Continued)

FOREIGN PATENT DOCUMENTS

EP 1452433 9/2004

*Primary Examiner* — Jeremy R Severson

(57) ABSTRACT

Example control devices for operating bicycle components are described herein. An example control device includes a housing having an opening to receive a handlebar of the bicycle and a rotating member rotatably coupled to the housing. The rotating member is rotatable about a first axis. The rotating member is configured to rotate between a first position and a second position to change an operating state of a component. The example control device includes a securing mechanism configured to lock the rotating member in the second position. The example control device also includes a release actuator coupled to the housing. The release actuator has an actuating surface to be engaged by a user and moved along a second axis that intersects the first axis. The release actuator is configured to, when actuated, unlock the securing mechanism to enable the rotating member to rotate back to the first position.

21 Claims, 17 Drawing Sheets

(56) References Cited

U.S. PATENT DOCUMENTS

| | | | | |
|---|---|---|---|---|
| 7,806,022 B2* | 10/2010 | Hara | ...................... | B62K 23/06 |
| | | | | 74/502.2 |
| 8,065,932 B2* | 11/2011 | Hara | ...................... | B62K 23/06 |
| | | | | 74/502.2 |
| 8,402,664 B1 | 3/2013 | Kitamura et al. | | |
| 8,539,857 B2* | 9/2013 | Chen | ...................... | B62K 23/06 |
| | | | | 74/502.2 |
| 9,809,278 B2 | 11/2017 | Kawakami | | |
| 2004/0261560 A1* | 12/2004 | Tsai | ...................... | B62K 23/04 |
| | | | | 74/473.25 |
| 2005/0103149 A1* | 5/2005 | Hunt | ...................... | B62K 23/02 |
| | | | | 74/502.2 |
| 2005/0126329 A1 | 6/2005 | Blaschke | | |

* cited by examiner

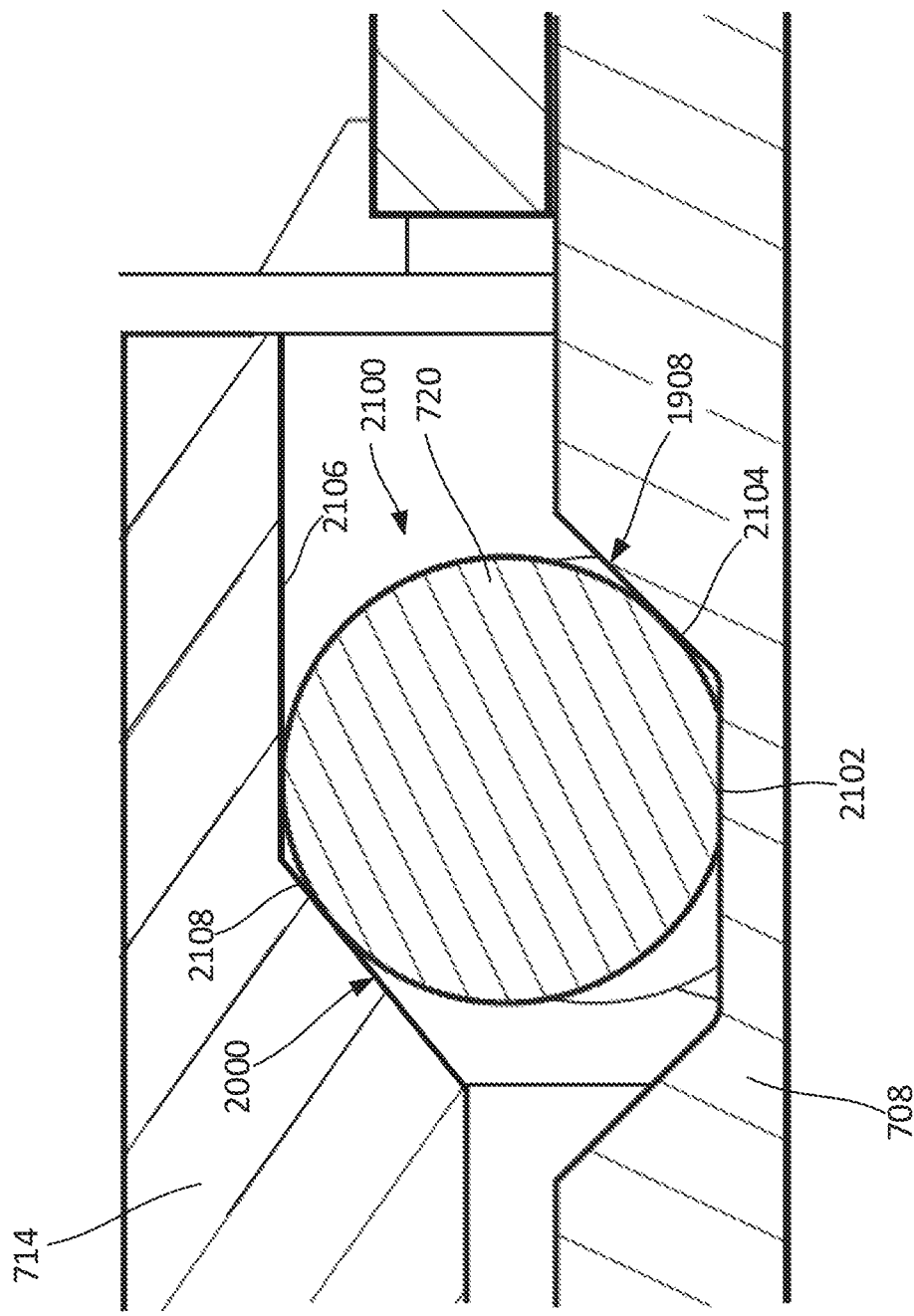

CONTROL DEVICES FOR OPERATING BICYCLE COMPONENTS

FIELD OF THE DISCLOSURE

This disclosure relates generally to control devices for bicycles and, more particularly, to control devices for operating bicycle components.

BACKGROUND

Bicycles often include components that may be operated between one or more operating states. Such components include suspension components, drivetrains components, seat posts or drop posts, etc. For example, some known suspension components are operable between a locked state and an unlocked state.

SUMMARY

Disclosed herein are examples of control devices for changing an operating state of a component of a bicycle. The control device includes a housing having an opening to receive a handlebar of the bicycle and a rotating member rotatably coupled to the housing. The rotating member is rotatable about a first axis. The rotating member is configured to rotate between a first position and a second position to change the operating state of the component between a first state and a second state, respectively. The control device also includes a securing mechanism configured to lock the rotating member in the second position and a release actuator coupled to the housing. The release actuator has an actuating surface to be engaged by a user and moved along a second axis that intersects the first axis. The release actuator is configured to, when actuated, unlock the securing mechanism to enable the rotating member to rotate back to the first position.

Another example control device for changing an operating state of a bicycle includes a housing having a first opening to receive a handlebar of the bicycle and a rotating member coupled to the housing. The rotating member is movable between a first position and a second position to change the operating state of the component between a first state and a second state, respectively. The rotating member includes a second opening extending between an inner surface and an outer surface of the rotating member. The control device also includes a securing member disposed in the housing and biased toward the inner surface of the rotating member. The securing member is to be disposed in the second opening when the rotating member is in the second position to lock the rotating member in the second position. The control device further includes a release actuator coupled to the housing. The release actuator is to, when actuated, move the securing member out of the second opening to enable the rotating member to move back to the first position.

Also disclosed herein is an example suspension system for a bicycle. The suspension system includes a suspension component operable between an unlocked state and a locked state, a cable coupled to the suspension component, and a control device to be coupled to a handlebar of the bicycle. The control device includes a housing to be coupled around the handlebar and a sleeve rotatably coupled to the housing. The sleeve has a first portion disposed within and rotatable within the housing. The sleeve also has a second portion extending axially outward from a side of the housing. The first portion has a cable anchor hub, and a cable wire of the cable is coupled to the cable anchor hub. The sleeve is rotatable between a first position and a second position to actuate the suspension component between the unlocked state and the locked state, respectively, by translating the cable wire. The control device also includes a gripping surface extending along an axial length of the second portion of the sleeve to enable a rider to grip and rotate the sleeve between the first position and the second position, a securing mechanism to lock the sleeve in the second position, and a release actuator configured to disengage the securing mechanism to enable the sleeve to rotate back to the first position.

BRIEF DESCRIPTION OF THE DRAWINGS

FIG. 21 is an enlarged view of a section of the control device of FIG. 20.

Figure 1:
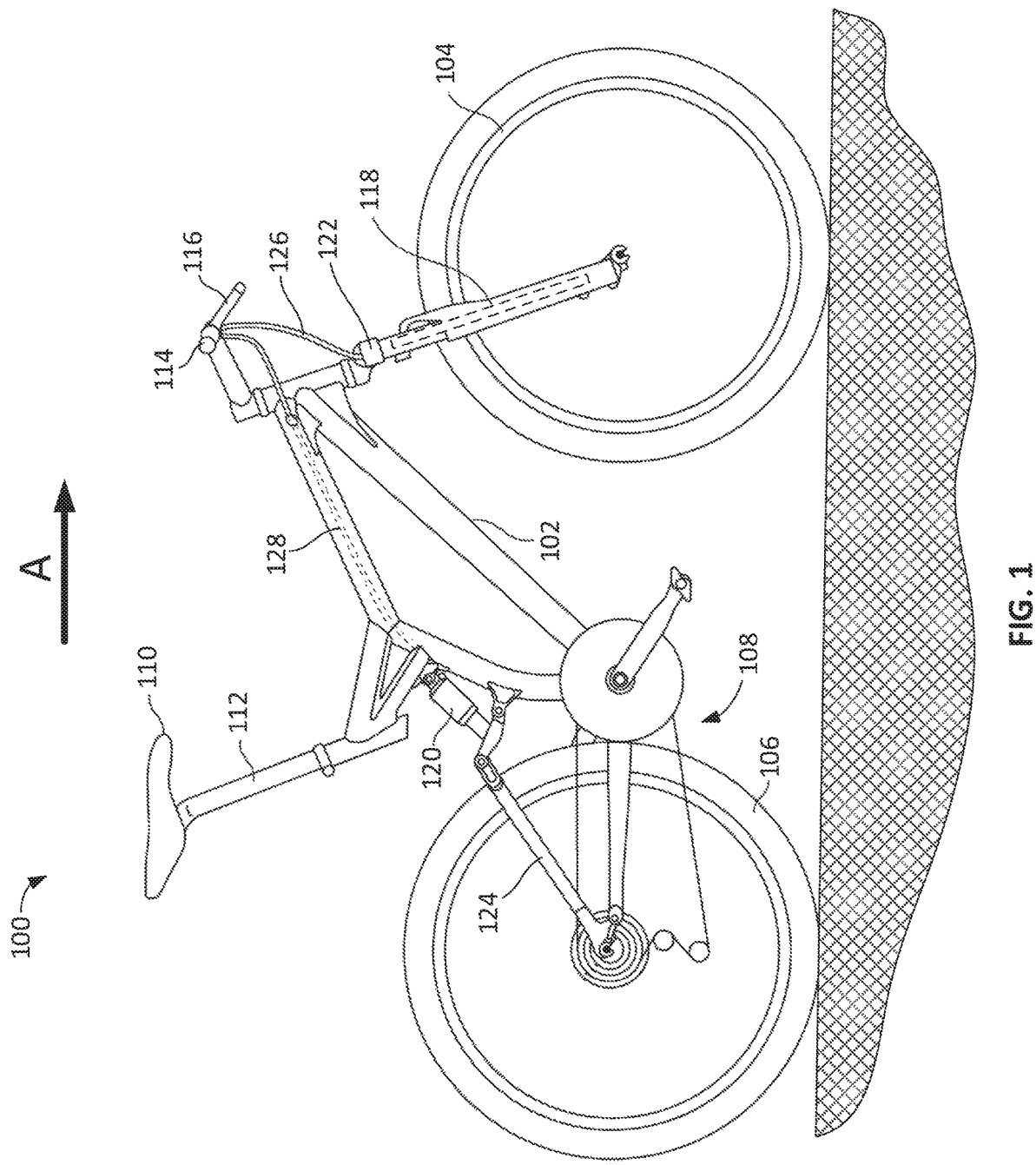
FIG. 1 is a side view of an example bicycle that may employ an example control device constructed in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example control devices that may be used to operate bicycle components between multiple operating states. For example, the control devices may be used to operate a cable-operated lockout mechanism on one or more suspension components between a first state, such as an unlocked state, and second operating state, such as a locked state. In other examples, the control devices can be used to operate a suspension component between other operating states, such as a first damping state and a second damping state. Further, the example control devices can be used to similarly operate other cable-operated bicycle component(s), such as a dropper seat post. The example control devices may be coupled to a handlebar of a bicycle and may be easily operated while riding the bicycle. The example control devices can be used to operate multiple components simultaneously (e.g., two suspension components).

Known control devices or actuating devices for bicycle components typically include a thumb-actuated lever or plunger for switching a bicycle component from one state to another state. While effective for their purpose, these known control devices have many drawbacks. For instance, using a thumb-activated lever requires the user to move his/her thumb relatively far from the handlebar and apply a relatively large force. This movement can be uncomfortable for the rider and cause strain on the rider's wrist. Further, this movement requires the rider to readjust his/her hand during or after engaging the lever, sometimes even unwrapping their hand from the handlebar, which may be undesirable in certain riding conditions. Also, these known control devices also include a release mechanism or lever that likewise requires the user to readjust his/her hand to operate. This is undesired, especially when riding at fast speeds, over rough terrain, and/or other riding conditions that may require a rider to maintain a firm grip on the handlebars. Additionally, when the control device is used on a handlebar having other devices, such as a brake lever or a drop seat post lever, the levers are often located close to the other devices. In some instances, it may be difficult, if not impractical, to operate the lever when another device is in the way.

Example control devices disclosed herein include a housing that can be clamped to a handlebar of a bicycle and a grip that extends outward from the housing and which is rotatable about the handlebar. The grip may be coupled (e.g., via one or more intermediate parts or directly) to a cable wire that is coupled to the bicycle component. The grip may be rotated between a first position and second position, which moves or translates the cable wire, to change the state of the bicycle component between a first operating state and a second operating state, respectively. The grip may be gripped in the palm of the hand, similar to a handlebar grip, and twisted or rotated to operate the bicycle component. This gripping and turning action is easier for a rider and enables a user to provide more leverage than using his/her thumb (as in some known control devices). Further, by enabling the rider to apply more leverage, the example control devices disclosed herein may be able to operate two or more bicycle components simultaneously. For example, the control devices may be used to simultaneously pull or release two cable wires at the same time, thereby changing the components between their two operating states simultaneously. Also, the rotational angle of the grip between the first position and the second position is relatively small, such that the rider generally does not need to readjust her/her hand while operating the control device. For example, in some instances, the grip is rotatable about 45° between the first position and the second position, which is a small enough rotational movement that the rider can continue to hold the handlebar and steer the bicycle without having to readjust his/her hand.

The example control devices disclosed herein also include a securing mechanism for locking or securing the grip in the second position and, thus, locking the bicycle component(s) in the second operating state. For example, the grip may be rotated (which pulls the cable wire(s)) from the first position to the second position, where the securing mechanism locks the control device in the second position (corresponding to the second operating state of the bicycle component(s)). The example control devices also include a release actuator for releasing or unlocking the securing mechanism and enabling the grip to be rotated back to the first position and, thus, change the bicycle component(s) back to the first operating state. In some examples, the bicycle component(s) bias the cable(s) to the first operating state. Therefore, in some examples, the grip may be twisted for a cable pull action, and the release actuator may be used for a cable release action. In other words, the grip, when twisted, pulls the cable(s) (e.g., against the bias of the bicycle component(s)) to change the bicycle component(s) from the first operating state to the second operation state. The release actuator, when activated, releases the grip and allows the cable(s) to move back to their original position (e.g., under the bias of the bicycle component(s)).

In some examples, the release actuator is coupled to the housing and disposed in a location close to the position of the rider's thumb. The release actuator has an actuating surface that may be pressed by the rider to release the securing mechanism. In some examples, the release actuator is moveable into the housing and along an axis that is perpendicular to the rotational axis of the grip (e.g., a central axis of the handlebar). Thus, the rider does not have to move his/her thumb a large distance to release the securing mechanism as is required when using some known control devices. Also, the release actuator may be actuated via a relatively small movement (e.g., about 1 millimeter). The release actuator operates generally independent of the cable tension on the control device. As such, the rider only has to provide a light touch to the release actuator to disengage the securing mechanism. As a result, the rider does not have to resituate his/her hand and/or provide a large actuating force, as seen in some known control devices.

Turning now to the figures, FIG. 1 illustrates an example bicycle 100 that may employ an example control device constructed in accordance with the teachings of this disclosure. In the illustrated example, the bicycle 100 includes a frame 102, a front wheel 104 and a rear wheel 106 rotatably coupled to the frame 102, and a drive train 108. A front and/or forward riding direction or orientation of the bicycle 100 is indicated by the direction of the arrow A in FIG. 1. As such, a forward direction of movement for the bicycle 100 is indicated by the direction of arrow A. The example bicycle 100 includes a seat 110 coupled to the frame 102 (e.g., near a rear end of the frame 102 relative to the forward direction A) via a seat post 112. The bicycle 100 also includes handlebars 114 coupled to the frame 102 (e.g., near a forward end of the frame 102 relative to the forward direction A). In the illustrated example, the bicycle 100 includes a brake lever 116 coupled to the handlebars 114 for actuating a rear brake and/or a front brake of the bicycle 100. In some examples, the bicycle 100 includes more than one brake lever. While the example bicycle 100 illustrated in FIG. 1 is depicted as a mountain bike, the control device examples disclosed herein may likewise be used with other types of bicycles.

In the illustrated example, the bicycle 100 includes a suspension system having one or more suspension components including a front suspension component 118 and a rear suspension component 120. The front and rear suspension components 118, 120 are shocks (sometimes referred to as shock absorbers). In this example, the front suspension component 118 is integrated into a fork 122 that couples the front wheel 104 and the frame 102. The rear suspension component 120 is coupled between the rear wheel 106 and a swing arm 124 of the frame 102. The front and rear suspension components 118, 120 absorb shocks while riding the bicycle 100 (e.g., when riding over rougher terrain). In other examples, the front suspension component 118 and/or the rear suspension component 120 may be integrated into the bicycle 100 in other configurations or arrangements. Further, in other examples, the suspension system may employ only one suspension component (e.g., only one shock absorber, such as the front suspension component 118) or more than one suspension component (e.g., an additional suspension component on the seat 110 of the bicycle 100) in addition to or as an alternative to the front and/or rear suspension components 118, 120.

In some examples, the front suspension component 118 has a lockout mechanism that enables the front suspension component 118 to move from one operating state to another operating state with substantially increased resistance to relative so as to operate in a locked state. In particular, the front suspension component 118 may be actuated between an unlocked state (e.g., a first state or operating state) in which the front suspension component 118 operates normally to absorb shocks (e.g., by telescoping the fork 122) and a locked state (e.g., a second state or operating state) in which the front suspension component 118 is generally locked and remains substantially rigid relative to the frame 102. In an embodiment, the lockout mechanism is a cable operated lockout mechanism. A lockout feature is often desired when switching between riding on rougher terrain and smoother terrain and/or when changing a riding position from a seated position to an unseated position. For example, it may be desired to have the front suspension component 118 absorb shocks while riding over rough terrain or while traveling downhill. However, it may not be desired when riding over smooth terrain or riding up hill, for instance, because the suspension may absorb some of the rider's pedaling power. In some examples, the lockout feature may not render the front suspension component 118 completely rigid. In another example, the lockout feature may fully restrict relative movement of the front suspension component 118 when the front suspension component 118 is operating in a lockout state.

In the illustrated example, the suspension system includes a first cable 126 (sometimes referred to as a control cable) coupled to the front suspension component 118 for changing (e.g., switching) the operating state of the front suspension component 118 between the unlocked state and the locked state. In particular, when a cable wire (sometimes referred to as an inner cable) within the first cable 126 is pulled a threshold amount (e.g., 20 millimeters (mm)), the front suspension component 118 is switched from the unlocked state to the lock state. Conversely, when the cable wire is released (and/or pushed) in the opposite direction, the front suspension component 118 is switched back to the unlocked state. In other examples, the relationship between the direction of the cable movement and the states of the front suspension component 118 may be reversed. The rear suspension component 120 has a similar cable-operated lockout mechanism and a second cable 128 that operates the lockout mechanism in a similar manner.

Figure 2:
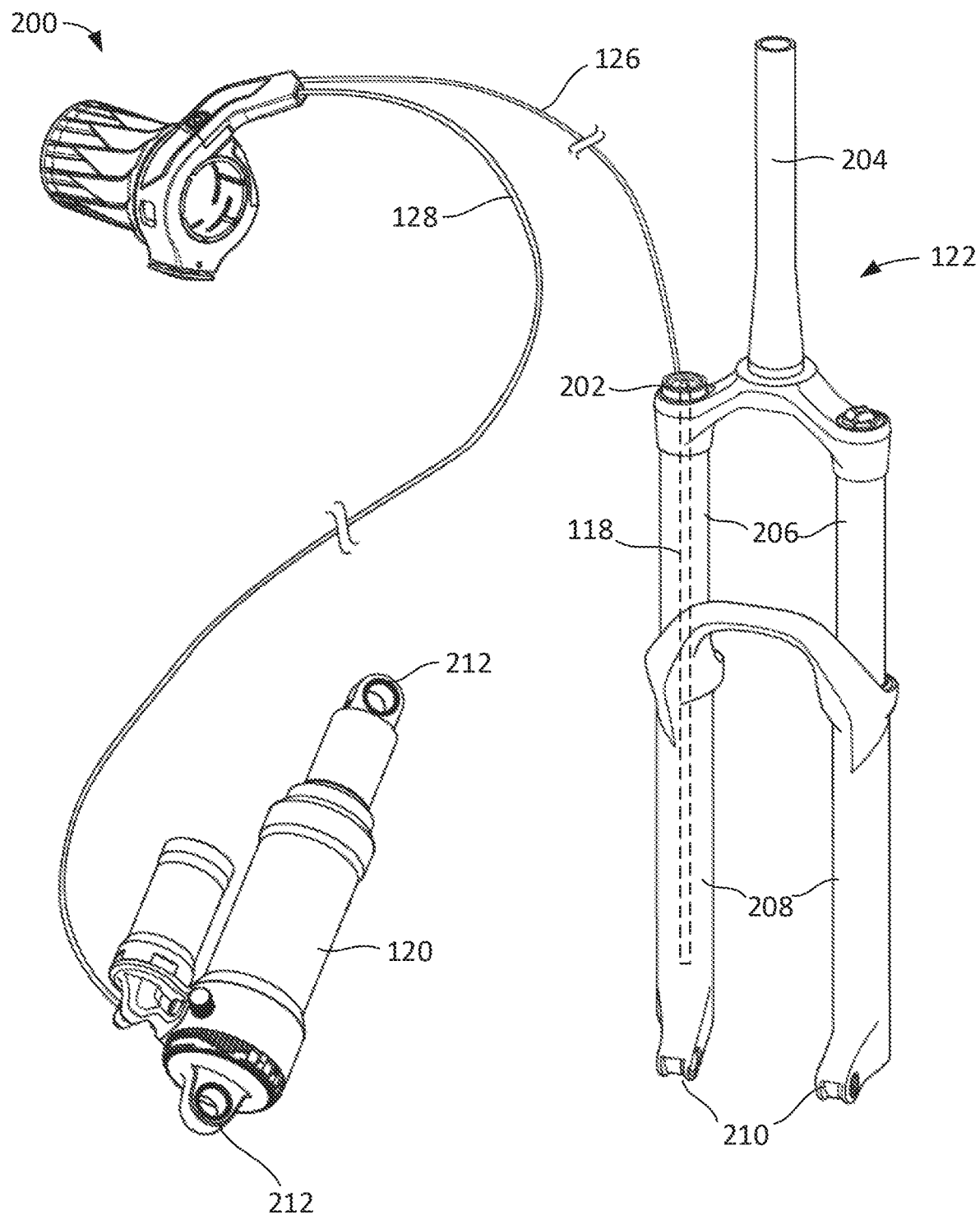
FIG. 2 illustrates an example suspension system of the example bicycle of FIG. 1 and an example control device that may be used to change the operating state(s) of one or more suspension components.

FIG. 2 shows the suspension system of the bicycle 100 (FIG. 1) including the front suspension component 118, the rear suspension component 120, and an example control device 200 constructed in accordance with the teachings of the present disclosure. The control device 200 may be used to remotely actuate or operate one or more bicycle component(s) between a first state and a second state. For example, the example control device 200 that may be used to change the operating states of the front and rear suspension components 118, 120.

In this example, the control device 200 is operatively coupled to the front suspension component 118 via the first cable 126 to selectively switch the front suspension component 118 between the unlocked state (e.g., a first operating state) and the locked state (e.g., a second operating state). In particular, the first cable 126 includes a cable wire that is coupled between the control device 200 and a front suspension component 118 lockout mechanism 202. The control device 200 may be operated to pull the cable wire of the first cable 126 in one direction, which activates (e.g., by rotating) the lockout mechanism 202 to operate the front suspension component 118 in the locked state. Conversely, the control device 200 may be operated to push (or release) the cable wire in the opposite direction, which activates the lockout mechanism 202 to operate the front suspension component 118 in the unlocked state. Thus, the control device 200 may be used to switch the front suspension component 118 between the unlocked state and the locked state. In some examples, the lockout mechanism 202 is biased (e.g., via a spring) to the unlocked position (e.g., an unspooled position). As such, the control device 200 may be used to pull the cable in one direction (e.g., against the bias of the lockout mechanism 202) to lock the front suspension 118, and release the cable in the opposite direction (e.g., under the bias of the lockout mechanism 202) to unlock the front suspension 118.

In the illustrated example, the fork 122 includes a steering tube 204 coupled to upper legs 206 (sometimes referred to as inner legs or stanchions). The steering tube 204 is coupled to the frame 102 (FIG. 1) and the handlebars 114 (FIG. 1). The upper legs 206 are slidably received within lower legs 208 (sometimes referred to as sliders). The lower legs 208 include respective front wheel attachment portions 210 for attaching to the fork 122 the front wheel 104 (FIG. 1). The front suspension component 118, which, in this example is a shock absorber, is integrated into the fork 122 between the upper legs 206 and the lower legs 208. For example, the front suspension component 118 may include a damper disposed within of one of the upper legs 206 and/or a spring disposed within the other upper leg 206. Other configurations are also possible, for example wherein a damper and a spring are disposed in a same leg and/or wherein lower legs are received within lower legs.

In the unlocked state, the front suspension component 118 allows the upper legs 206 to slide into and out of the lower legs 208, which helps absorbs shocks and vibrations. In the locked state, the upper legs 206 are substantially rigid and generally do not move relative to the lower legs 208. The lockout mechanism 202 switches the front suspension component 118 between the locked and unlocked state (e.g., by locking fluid within the damper or allowing fluid into/out of the damper).

In this example, the control device 200 is also operatively coupled to the rear suspension component 120 via the second cable 128 for similarly changing the operating state of the rear suspension component 120 between the unlocked state and the locked state. The rear suspension component 120 includes frame attachment portions 212 for attaching between two or more frame portions, such the frame 102 and the swing arm 124. The rear suspension component 120 includes a lockout mechanism similar to the lockout mechanism 202. The lockout mechanism switches the rear suspension component 120 between the unlocked state, in which the frame attachments portions 212 are movable toward/away from each other (thereby enabling the rear wheel 106 (FIG. 1) to move upward/downward relative to the frame 102 (FIG. 1)), and a lock state where the frame attachment portions 212 are substantially locked at a fixed distance from each other. As such, in some examples, the control device 200 may be used to simultaneously operate (e.g., switch between two states) two bicycle components. In other examples, the control device 200 may be operatively coupled to only one component, such as just the front suspension component 118. In still other examples, more than two bicycle components may be operated by the control device 200. For example, the control device 200 may be operatively coupled to additional suspensions components. The control device 200 enables a rider to change the operating states of the front and/or rear suspension components 118, 120 remotely (as opposed to manually activating the lockout mechanisms on the front and rear suspension components 118, 120 via a hand operated lever or other feature rotated on the front and rear suspension components 118, 120).

Figure 3:
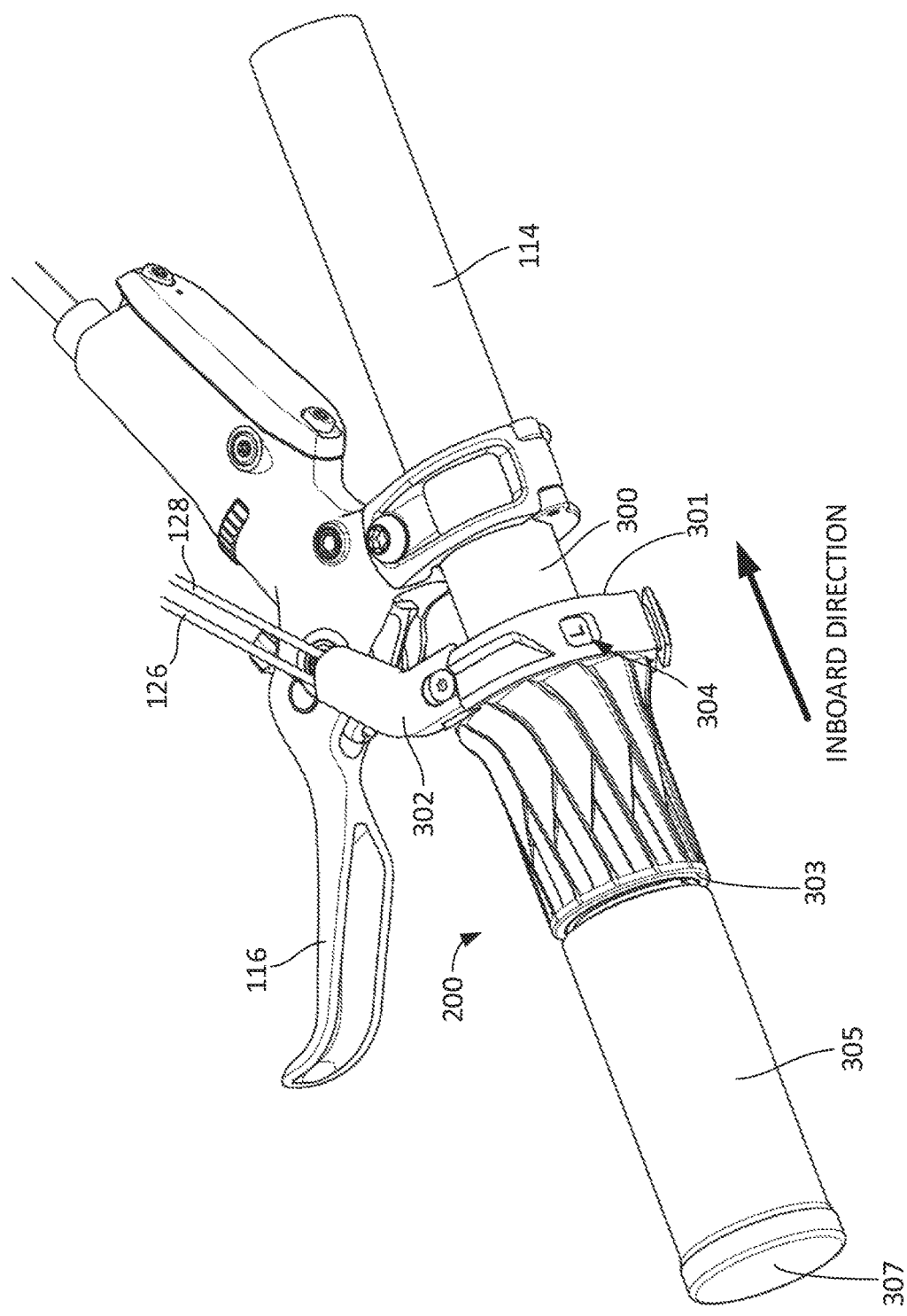
FIG. 3 illustrates the example control device on a handlebar of the example bicycle of FIG. 1.

As illustrated in FIG. 3, the control device 200 may be coupled to the handlebars 114 of the bicycle 100. In the example of FIG. 3, the control device 200 is coupled to a left handlebar 300 of the handlebars 114. As such, a rider may use his/her left hand to interact with the control device 200 and operate the associated bicycle component(s), such as the front and rear suspension components 118, 120 (FIGS. 1 and 2), while holding onto the left handlebar 300. This enables the rider to interact with the bicycle component(s) while riding the bicycle 100 and without significantly adjusting (if at all) his/her hands from the handlebars 114. The control device 200 has an inboard side 301 that faces toward a center of the handlebars 114 (e.g., a center of the bicycle 100 (FIG. 1) in the direction of the inboard arrow and an outboard side 303 that faces away from a center of the handlebars 114. In the illustrated example, the control device 200 is disposed on the left handlebar 300 outboard of the brake lever 116. The bicycle 100 also includes a handlebar grip 305 disposed on the left handlebar 300 outboard of the control device 200. A cap 307 is disposed on the outboard end of the left handlebar 300. In general, a rider holds the left handlebar 300 by gripping the handlebar grip 305 with his/her left hand. The rider can then use his/her left to interact with the control device 200 and/or brake lever 116, which are disposed relatively close to the handlebar grip 305. While in this example the control device 200 is coupled to the left handlebar 300, in other examples the control device 200 may be coupled to a right handlebar and/or another structure of the bicycle 100 (e.g., a member of the frame 102 (FIG. 1)).

As shown in FIG. 3, the control device 200 includes a cable guide 302 that directs the first and second cables 126, 128 in a specific direction away from the left handlebar 300 so as not to interfere with the other components on the left handlebar 300, such as the brake lever 116. In FIG. 3, the cable guide 302 is curved slightly to the right. In other examples, the cable guide 302 may be shaped differently. For example, instead of being curved to the right, the cable guide 302 may be substantially straight or curved in the opposite direction. The cable guide 302 may be removed and replaced with another cable guide having a different shape as desired. As such, the control device 200 can be easily customized to direct the cables 126, 128 based on the location of the other component(s) (if any) on the handlebars 114.

Figure 4:
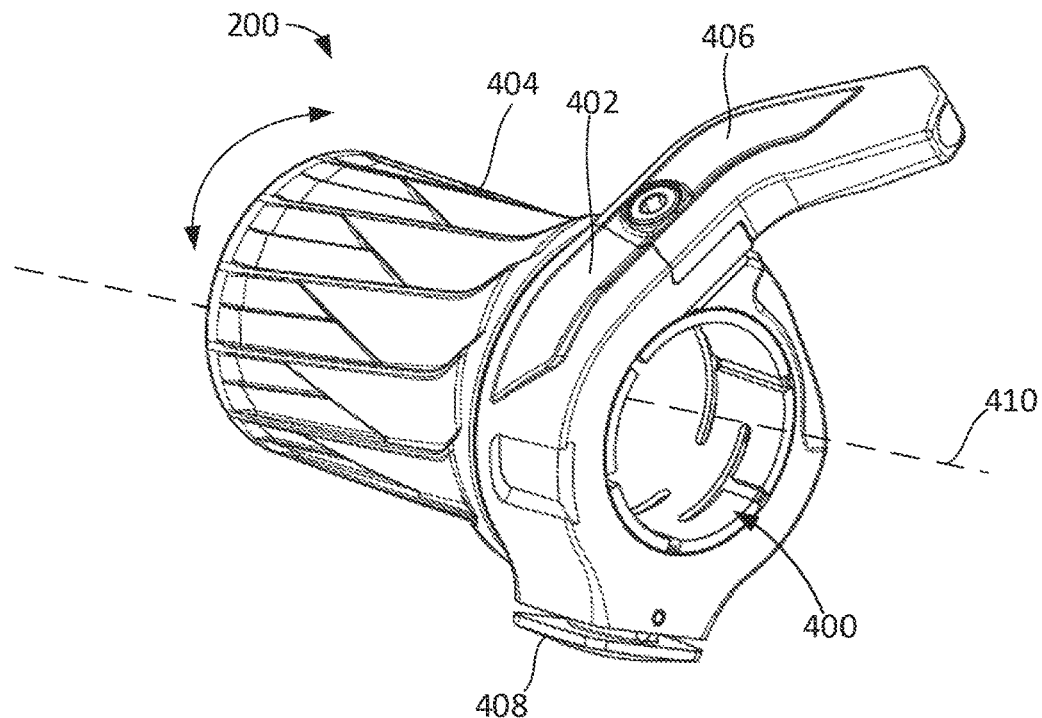
FIG. 4 is an isolated perspective view of the example control device of FIG. 2.
Figure 5:
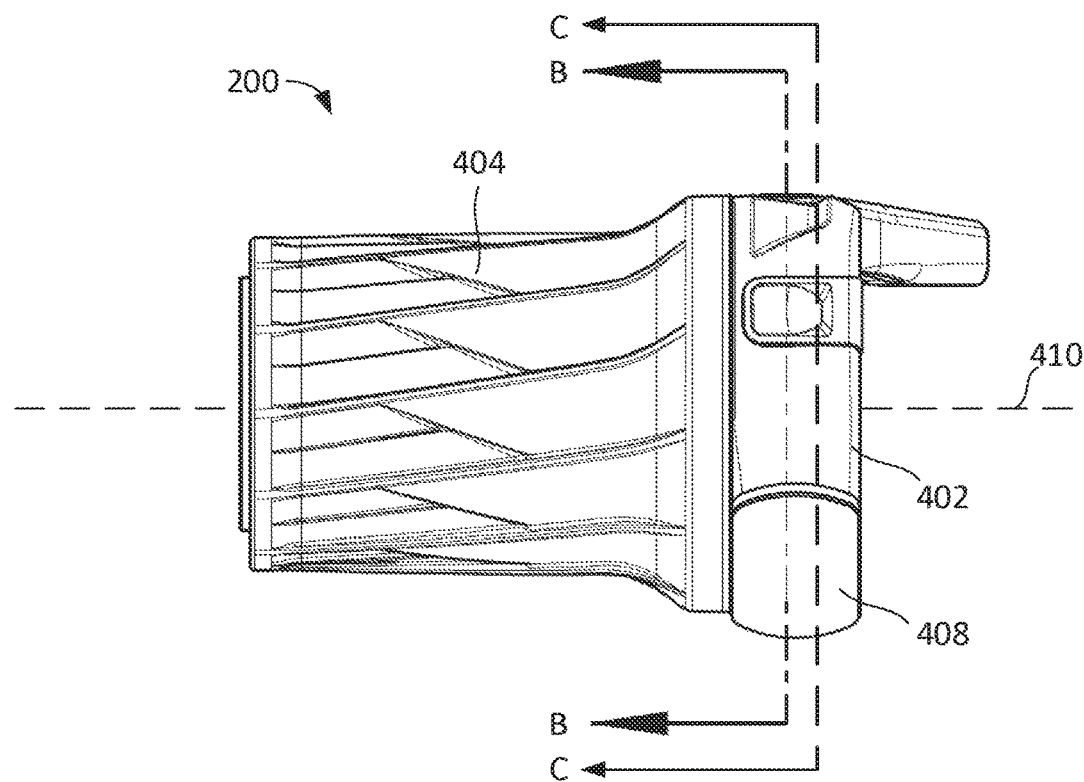
FIG. 5 is a side view of the example control device of FIG. 2.
Figure 6:
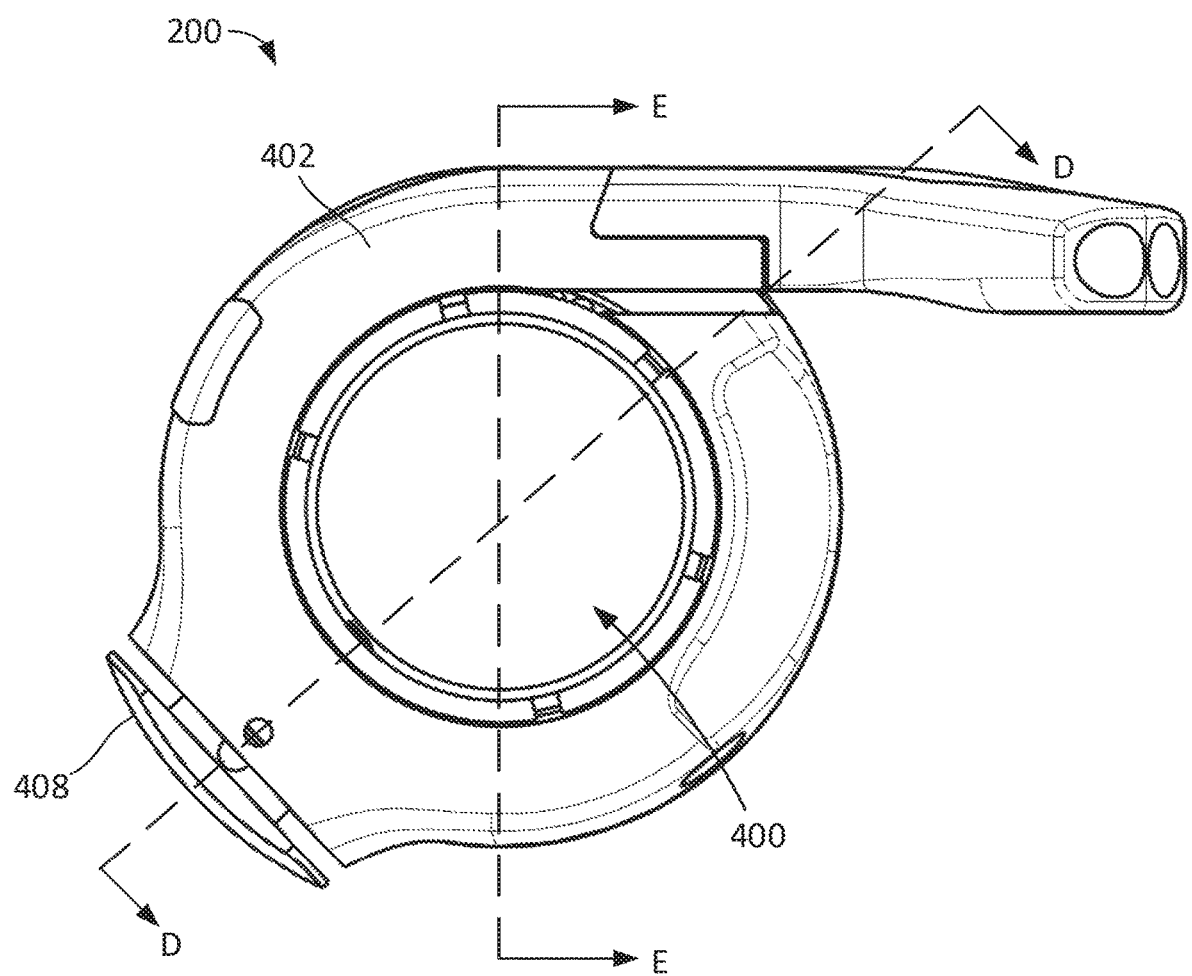
FIG. 6 is another side view of the example control device of FIG. 2.

FIGS. 4-6 are isolated views of the example control device 200. The control device 200 includes an opening 400 to receive a handlebar of a bicycle, such as the left handlebar 300 as shown in FIG. 3. The control device 200 may be slid onto the left handlebar 300 from the end of the left handlebar 300, for example. In the illustrated example of FIGS. 4-6, the control device 200 includes a housing 402 and a grip 404 that is rotatably coupled to the housing 402. The housing 402 may be clamped onto the left handlebar 300 to secure the control device 200 to the bicycle 100. In some examples, the control device 200 includes a fastener for clamping or tightening the housing 402 onto the left handlebar 300. For example, as shown in FIG. 4, the control device 200 includes a fastener 406 (e.g., a threaded bolt) that may be tightened to radially compress or deform the housing 402 onto the left handlebar 300. In some examples, the control device 200 includes a body tube disposed between the housing 402 and the left handlebar 300. The housing 402 can be compressed radially inward onto the body tube, which flexes inward onto the left handlebar 300, thereby clamping the control device 200 onto the left handlebar 300. An example body tube is disclosed in further detail herein in connection with FIG. 19. Additionally or alternatively, in other examples, a clamping ring or device may be provided to clamp the control device 200 to the left handlebar 300.

When the housing 402 is coupled to the left handlebar 300, for example, the grip 404 is rotatable about the left handlebar 300 (and relative to the housing 402) between a first position (e.g., a first angular position) and a second position (e.g., a second angular position), which correspond to the first operating state and the second operating state, respectively, of the bicycle component(s) being controlled by the control device 200. When being used with the front and rear suspension components 118, 120, for example, the first position may correspond to the unlocked state and the second position may correspond to the locked state. The grip 404 is coupled (e.g., via a rotating member disclosed in further detail herein) to the cable wires of the first and second cables 126, 128. As such, when the grip 404 is rotated in one direction, such as from the first position to the second position, the cable wires are pulled (translated) in one direction, which changes the front and rear suspension components 118, 120 into their locked states. Conversely, when the grip 404 is rotated in the opposite direction back to the first position, the cable wires are released (translated) in the opposite direction, which changes the front and rear suspension components 118, 120 back into their unlocked states. The grip 404 may be easily rotated between the first position and the second position by gripping and twisting the grip 404, thereby enabling a rider to change the operating state of the front and rear suspension components 118, 120 without removing their hand from the left handlebar 300.

In the illustrated example, the grip 404 is rotatable about a rotational axis 410, which is aligned with a central axis of the opening 400. When the control device 200 is coupled to the left handlebar 300, the rotational axis 410 is also aligned with a central axis of the left handlebar 300. In other words, the rotational axis 410 of the grip 404 is coaxial with the opening 400 and the handlebar to which it is coupled. In other examples, the rotational axis 410 may not be coaxial with the opening 400 and the left handlebar 300, for example on a non-circular cross section handlebar.

Figure 14:
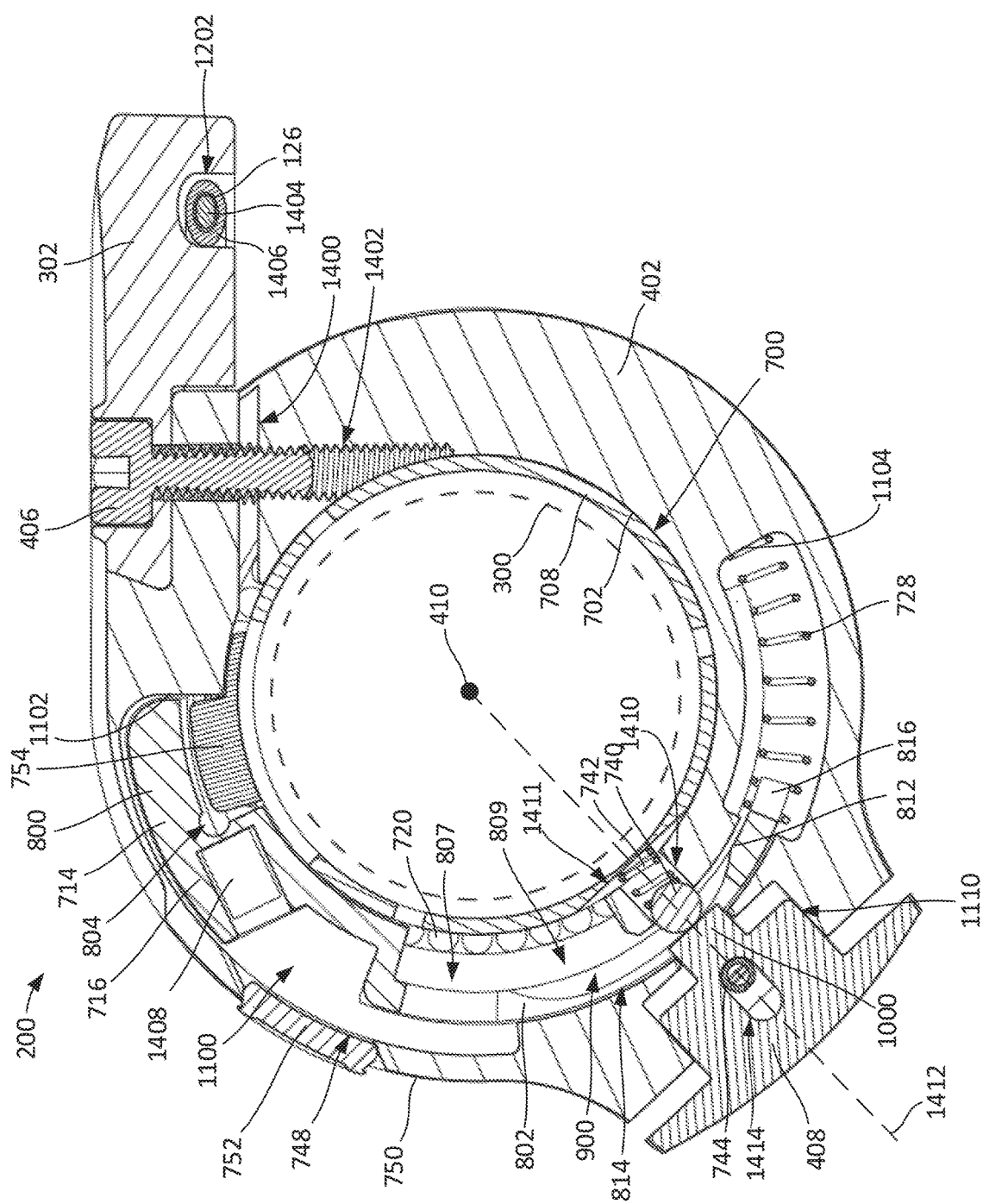
FIG. 14 is a cross-sectional view of the example control device taken along line B-B of FIG. 5 and showing an example rotating member in a first position.
Figure 15:
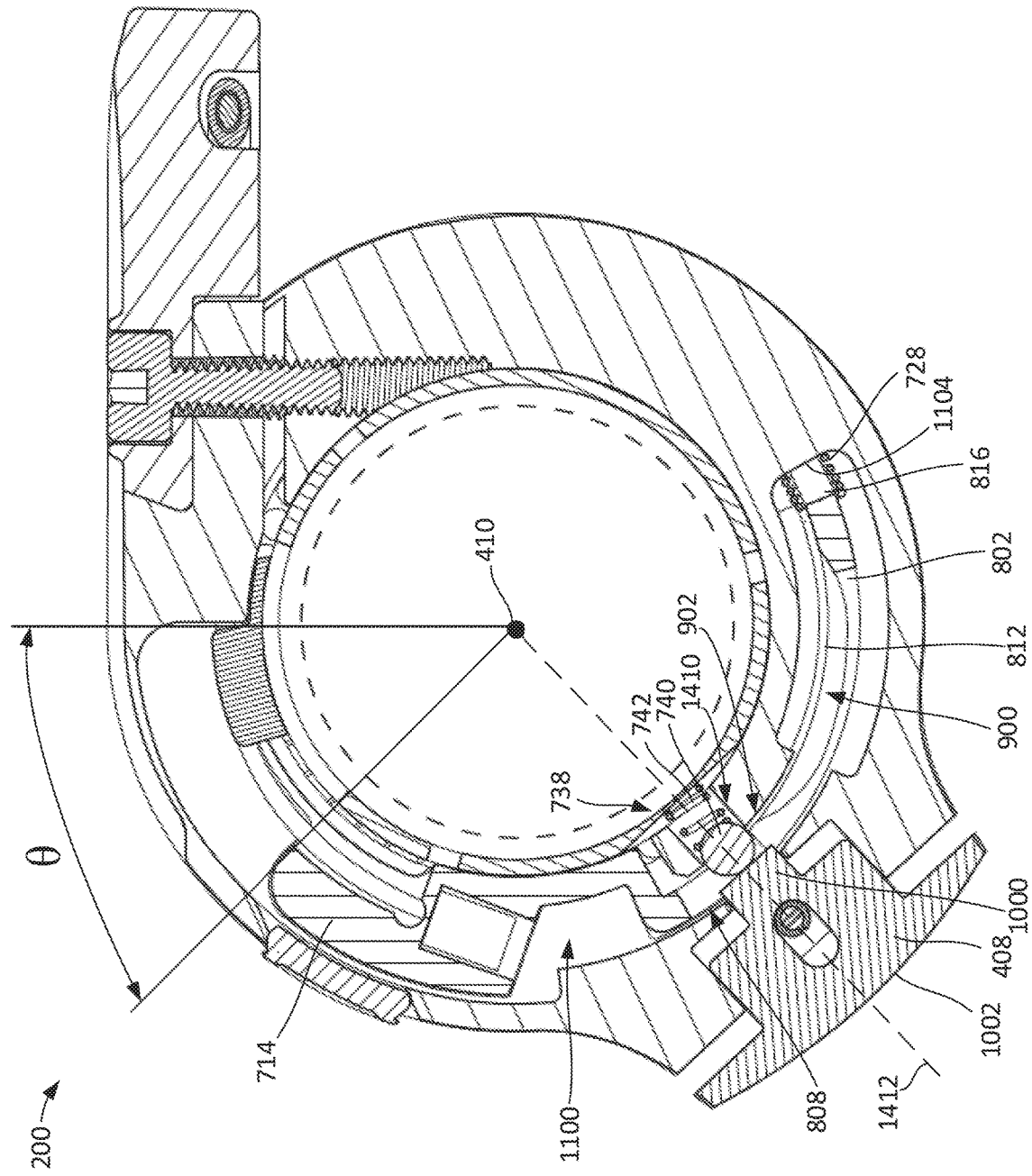
FIG. 15 shows the example control device of FIG. 14 with the example rotating member in a second position.
Figure 16:
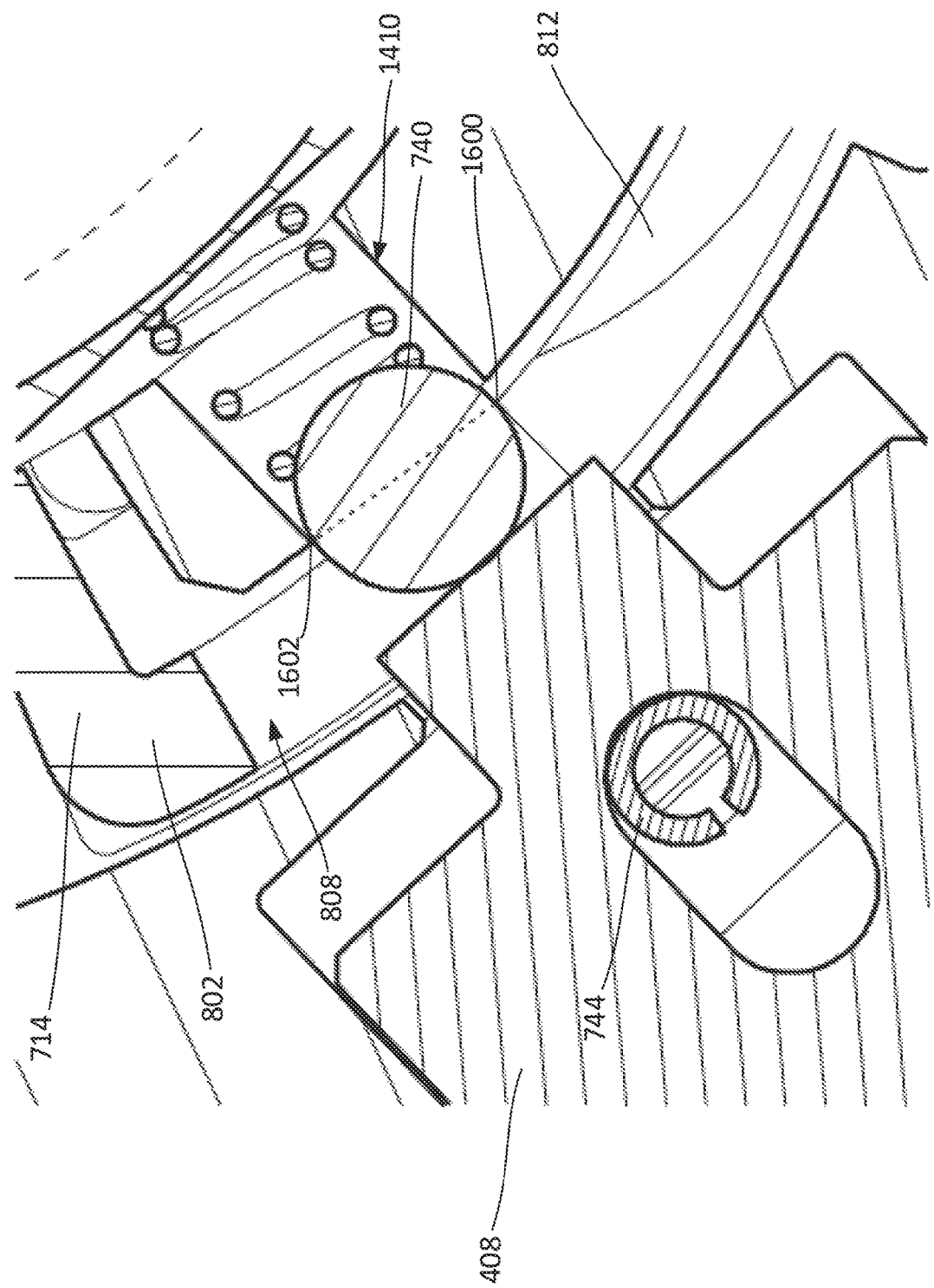
FIG. 16 is an enlarged view of a section of the example control device of FIG. 15 showing an example securing mechanism.

In some examples, the control device 200 includes a securing mechanism (an example of which is disclosed in further detail in connection with FIGS. 14-16) that releasably locks the grip 404 in the second position and, thus, locks the front and rear suspension components 118, 120 in their locked state (the second operating state). For example, a rider may rotate the grip 404 from the first position (corresponding to the unlocked state) to the second position (corresponding to the locked state) and, when the grip 404 reaches the second position, the securing mechanism automatically locks the grip 404 in the second position. In some examples, the securing mechanism is disposed within the housing 402.

To release the securing mechanism and enable the grip 404 to be rotated back to the first position (corresponding to the unlocked state), the example control device 200 includes a release actuator 408 (e.g., a button) coupled to the housing 402. If the release actuator 408 is actuated (e.g., pushed or depressed), the securing mechanism is released and the grip 404 can be rotated back to the first position. In some examples, the release actuator 408 is actuated by moving the release actuator 408 linearly inward (e.g., in a radially inward direction toward the rotational axis 410). For example, a rider may use his/her thumb to push the release actuator 408 inward to release the securing mechanism. In some examples, the grip 404 is biased toward the first position by the tension in the cable wires and/or another biasing element in the housing 402, such as a return spring (e.g., an extension spring or compression spring). As such, in some examples, once the release actuator 408 is actuated and the securing mechanism is released, the grip 404 returns to the first position and, thus, relieves tension in the cable wires to enable the front and rear suspension components 118, 120 to return to their unlocked states.

In some examples, the grip 404 is constructed of an elastomeric material, such as rubber, which enables a rider to sufficiently grasp the grip 404 for rotation. In other examples, the grip 404 may be constructed of other materials in addition to or as an alternative to elastomeric material.

In some examples, the rotational angle between the first position the second position is relatively small, such as 45° or less. This small rotational angle enables a rider to operate the control device 200 (by rotating the grip 404 between the first and second positions) without necessarily resituating or repositioning his/her hand. In other words, the rotational angle is small enough that a rider can continue to comfortably hold the left handlebar 300 after rotating the grip 404 from the first position to the second position without the need to readjust his/her hand. Further, the release actuator 408 is disposed in a location that is near the rider's thumb on the left handlebar 300 (e.g., on the inboard side of the control device 200 and facing rearward toward the rider). Therefore, to activate the release actuator 408, only a very small movement of the thumb is needed. The rider can generally maintain his/her left hand on the left handlebar 300 while operating the control device 200, unlike known control devices that may require the rider to remove or significantly reposition his/her hand on the handlebars to operate the control device.

Figure 7:
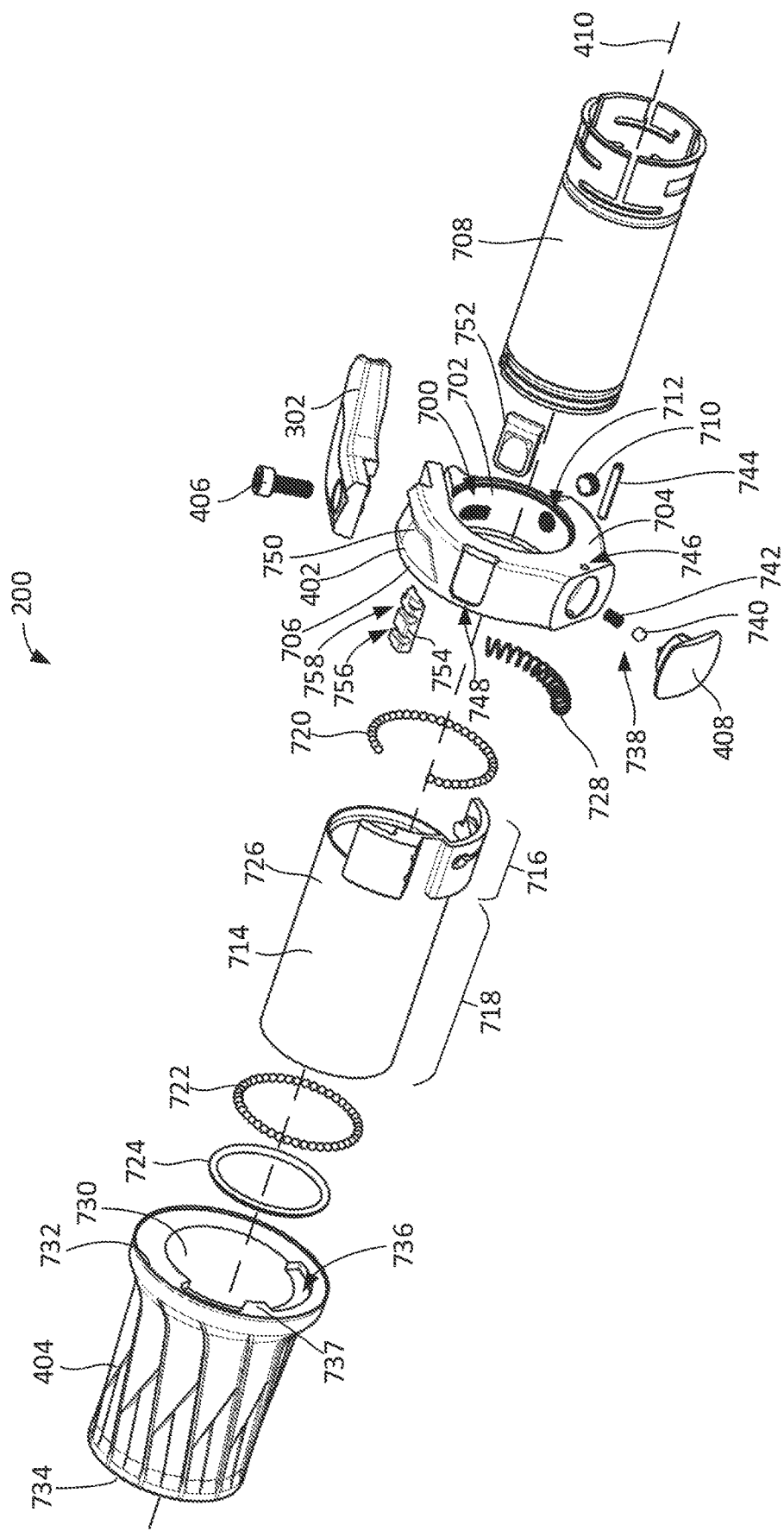
FIG. 7 is an exploded view of the example control device of FIG. 2.

FIG. 7 is an exploded view of the example control device 200. In the illustrated example, the housing 402 includes an opening 700 (e.g., a channel), defined by an inner surface 702 of the housing 402, and extending between a first side 704 (e.g., an inboard side) of the housing 402 and a second side 706 (e.g., an outboard side) of the housing 402 opposite the first side 704. The opening 700 is to receive a handlebar or any other structure to which the control device 200 is to be coupled. For example, when the control device 200 is disposed on the left handlebar 300 (FIG. 3) of the bicycle 100, the left handlebar 300 extends through the opening 700.

In the illustrated example, the control device 200 includes a body tube 708 that is to be disposed within the opening 700 and coupled to the inner surface 702 of the housing 402. In some examples, a threaded fastener 710 is inserted into a threaded opening 712 in the housing 402, which extends into the opening 700 of the housing 402, and couples the body tube 708 to the inner surface 702 of the housing 402. When the control device 200 is disposed on the left handlebar 300 (FIG. 3), the body tube 708 contacts the left handlebar 300, and the housing 402 is disposed around the body tube 708. The housing 402 may be deformed radially inward, via the threaded fastener 406, to clamp the housing 402 and the body tube 708 to the left handlebar 300, thereby constraining the body tube 708 between the housing 402 and the handlebar to affix the control device 200 to the handlebar. The body tube 708 and the housing 402 remain fixed (non-rotatable) when clamped onto the left handlebar 300. The body tube 708 may be sized to fit a particular diameter and/or shaped handlebar. Thus, the example control device 200 may be manufactured in different sizes and/or shapes for different sized and/or shaped handlebars.

In the illustrated example, the control device 200 also includes a rotating member 714. The rotating member 714 is concentric with and rotatable on the body tube 708. In this example, the rotating member 714 is a sleeve or cylinder. Further, the rotating member 714 is rotatably coupled to the housing 402. In particular, the rotating member 714 includes a first portion 716 and a second portion 718. When the control device 200 is assembled, the first portion 716 is disposed within a cavity (disclosed in further detail in connection with FIG. 11) of the housing 402 and the second portion 718 extends axially outward from the housing 402 (in a direction parallel to the rotational axis 410). As disclosed in further detail herein, the first portion 716 of the rotating member 714 is coupled to the cable wire(s) of the bicycle component(s) and operates to translate the cable wire(s) as the rotating member 714 rotates.

The example control device 200 may include one or more friction reducing devices for reducing friction between the rotating member 714 and the body tube 708. The friction reducing device(s) enable the rotating member 714 to rotate smoothly on the body tube 708 and, thus, around the handlebar. For example, as shown in FIG. 7, the control device 200 includes a first bearing 720 (e.g., a set of ball bearings) and a second bearing 722 that are disposed between the rotating member 714 and the body tube 708. In other examples, other types of friction reducing devices may be used in addition to or as an alternative to the first and second bearings 720, 722. For example, a low friction sleeved material interface may be used. In the displayed embodiment, the first and second bearings 720, 722 enable the rotating member 714 to rotate smoothly on the body tube 708. The example control device 200 also includes a seal 724 (e.g., an O-ring) to retain the second bearing 722 in position. The first and second bearings 720, 722 and the seal 724 are disclosed in further detail herein in connection with FIGS. 19, 20, and 21.

The body tube 708 and the rotating member 714 may be constructed of any rigid or semi-rigid material, such as plastic, a metal alloy (e.g., an aluminum (AL) alloy), etc. As disclosed in further detail herein, the body tube 708 may be flexed or compressed inward onto the handlebar. In some examples, using a softer material, such as plastic, minimizes marking on the handlebar when the control device 200 is clamped onto the handlebar.

In some examples, to enable a rider to rotate the rotating member 714, the control device 200 includes a gripping surface that extends along an axial length of the second portion 718 of the rotating member 714. The gripping surface may be constructed of a flexible material (e.g., rubber) that enables a rider to grip (e.g., with his/her fingers) and rotate the rotating member 714 between the first position and the second position. In the illustrated example of FIG. 7, the gripping surface is formed by the grip 404. When the control device 200 is assembled, the grip 404 is coupled to the rotating member 714. In particular, the grip 404 is coupled to an outer surface 726 of the rotating member 714 (e.g., along an axial length of the rotating member 714) such that the grip 404 and the rotating member 714 rotate together between the first position and the second position. In other words, the grip 404, when rotated, rotates the rotating member 714, which in turn releases or pulls the cable wire(s) associated with the bicycle component(s) to change the operating state(s) of the bicycle component(s). In other examples, the gripping surface may be integral or co-molded with the second portion 718 of the rotating member 714.

In some examples, the control device 200 includes a biasing element 728, such as a return spring (e.g., an extension spring or compression spring), to bias the rotating member 714 back to the first position. Additionally or alternatively, one or more biasing element(s) may be disposed at the controlled component(s), such as at the front and/or rear suspension components 118, 120 illustrated in FIG. 2. Referring again to the illustrated example FIG. 7, the grip 404 and the rotating member 714 are rotatable about the rotational axis 410, which is aligned (coaxial) with the central axes of the grip 404 and the rotating member 714.

In some examples, the grip 404 is coupled to the rotating member 714 via an interference fit (e.g., press fit or friction fit) formed between an inner surface 730 of the grip 404 and the outer surface 726 of the second portion 718 of the rotating member 714. In other words, the inner diameter of the grip 404 may be slightly smaller than the outer diameter of the second portion 718 of the rotating member 714. In some examples, the grip 404 includes a rigid inner member that is disposed along the inner surface 730 of the grip 404 and/or embedded within the elastomeric material of the grip 404. In some examples, to assemble the grip 404 on the rotating member 714, the grip 404 may be stretched open (slightly) and pulled onto the second portion 718 of the rotating member 714. Once released, the compressive force of the material of the grip 404 maintains the grip 404 on the outer surface 726 of the rotating member 714. In the illustrated example, the grip 404 has a first end 732 and a second end 734 opposite the first end 732. When the control device 200 is assembled, the first end 732 of the grip 404 is disposed on or near the second side 706 (e.g., the outboard side) of the housing 402.

Figure 8:
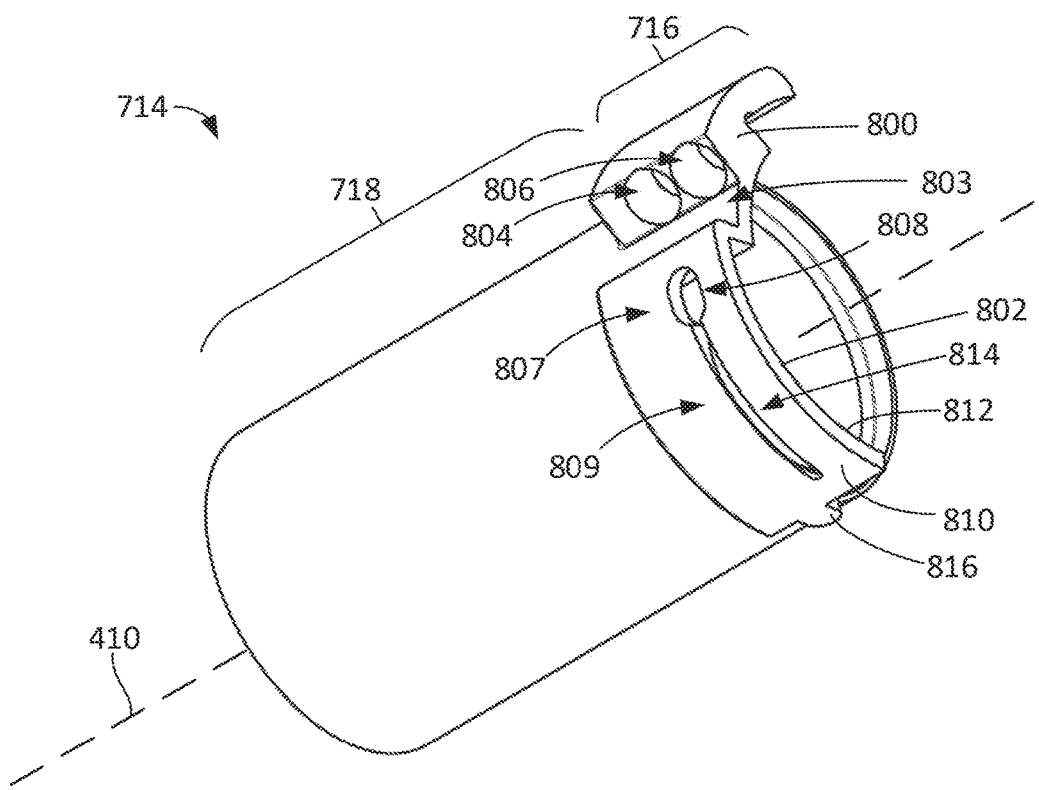
FIG. 8 is an isolated perspective view of an example rotating member of the example control device of FIG. 2.

In some examples, the first end 732 of the grip 404 includes a keyed opening 736 (e.g., a recess, a groove, etc.) that mates with the side of the first portion 716 of the rotating member 714 and, thus, further locks the grip 404 and the rotating member 714 together. As such, rotational motion of the grip 404 is transferred to the rotating member 714, and vice versa. The keyed opening 736 matches the side profile of the first portion 716 of the rotating member 714. As disclosed in further detail in connection with FIG. 8, the first portion 716 may include a cable anchor hub 800 and a curved wall 802 (see FIG. 8), which are separated by a slot 803. As shown in FIG. 7, the keyed opening 736 includes a protrusion 737 that is sized to fit within the slot 803 between the cable anchor hub 800 and the curved wall 802 of the first portion 716 of the rotating member 714. The protrusion 737 divides the keyed opening 736 into a first section that receives the cable anchor hub 800 (FIG. 8) and a second section that receives the curved wall 802 (FIG. 8). This interface between the keyed opening 736 and the side of the first portion 716 provides a relatively snug fit between the grip 404 and the rotating member 714 to enable transfer of rotational motion. In some examples, the keyed opening 736 is formed in the rigid inner member of the grip 404, which enables the grip 404 to effectively transfer rotational force to the rotating member 714, rather than independently twisting and/or deforming and not sufficiently transferring the rotational force.

The second portion 718 of the rotating member 714 and the grip 404 have an axial length sufficient to enable a rider to grip the rotating member 714 with one or more fingers. In some examples, the axial length of the grip 404 and the second portion 718 of the rotating member 714 is at least two inches. For example, the grip and the second portion may be configured extend to an end of a handlebar. In other examples, the grip 404 may be shorter than two inches.

The example control device 200 includes a securing mechanism 738 that may be used to releasably lock the rotating member 714 (and, thus, the grip 404) in the second position (corresponding to the locked state). The securing mechanism 738 is disposed within the housing 402. In some examples, the securing mechanism 738 includes a securing member 740 (e.g., a lock member or ball) and a biasing element 742 (e.g., a spring such as an extension spring or a compression spring). The release actuator 408 is coupled to the housing 402 via a pin 744, which is to be disposed within a pin opening 746.

In the illustrated example, the housing 402 includes an opening 748 in an outer radial surface 750 of the housing 402 that extends into an internal cavity (shown in FIG. 11) of the housing 402. The opening 748 may be used to attach the cable wire(s) to the first portion 716 of the rotating member 714 in the housing 402. In some examples, a cap 752 (e.g., a cover) is provided to cover the opening 748. The cap 752 may be slid over the opening 748. For example, the housing 402 may include a dovetail groove around the opening 748 for receiving the cap 752. In some embodiments, the opening 748 may remain uncovered. Also, in other examples, the opening 748 may be shaped differently. For example, as shown in FIG. 3, the opening does not extend to the side of the housing. As disclosed above, the control device 200 includes the cable guide 302, which is coupled to the housing 402 via the threaded fastener 406. The cable guide 302 guides or routes one or more cables (e.g., the first and second cables 126, 128) into/out of the housing 402. Also illustrated in FIG. 7 is a wire guide 754 having first and second grooves 756, 758 that may be disposed within the housing 402 and used to route the cable wire(s), as disclosed in further detail herein.

Figure 9:
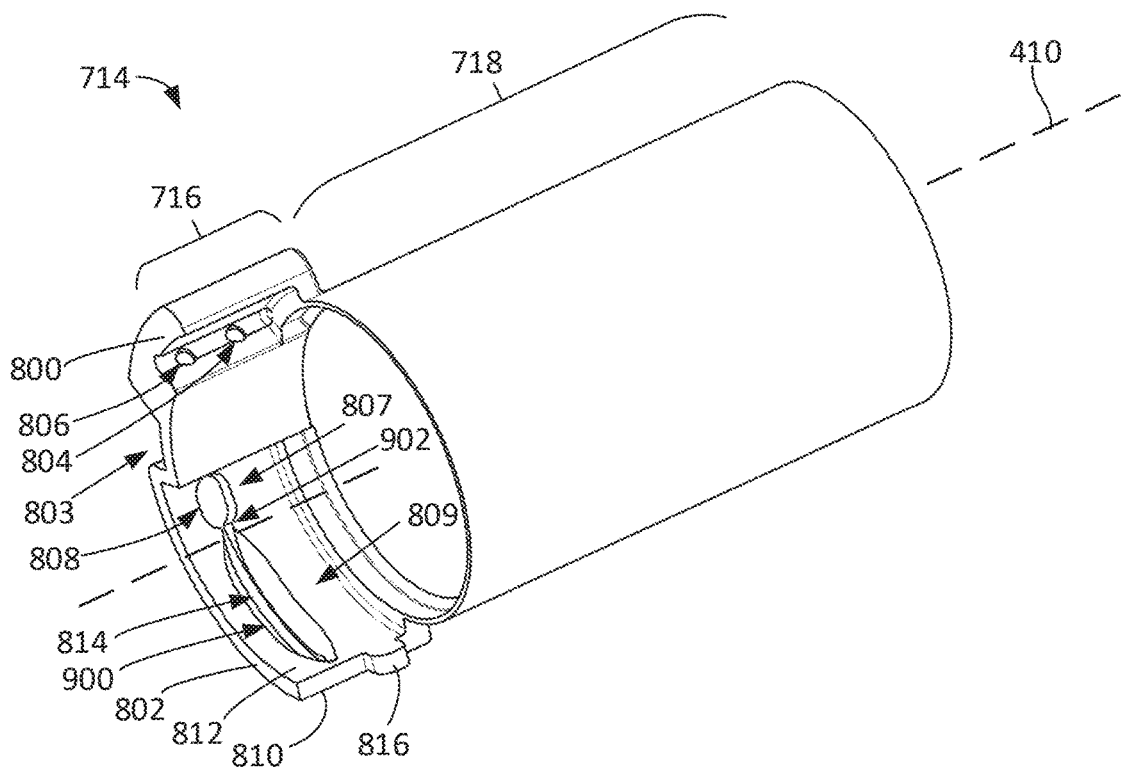
FIG. 9 is another isolated perspective view of the example rotating member of FIG. 8.

FIGS. 8 and 9 are isolated perspective views of the rotating member 714. As shown in FIGS. 8 and 9, the first portion 716 of the rotating member 714 includes a cable anchor hub 800 and a curved wall 802. The curved wall 802 serves to guide and interface with the securing member 740 (FIG. 7), as disclosed in further detail herein. In the illustrated example, the cable anchor hub 800 and the curved wall 802 extend along the rotational axis 410 from the second portion 718 and radially outward from the second portion 718 (e.g., in a direction parallel to the rotational axis 410 and radially away from the rotational axis 410). The cable anchor hub 800 and the curved wall 802 are separated by a slot 803 (in which the protrusion 737 (FIG. 7) of the keyed opening 736 (FIG. 7) may fit).

The cable anchor hub 800 includes one or more cable attachment portions for attaching one or more cable wires to the cable anchor hub 800 and, thus, to the rotating member 714. For example, as illustrated in FIGS. 8 and 9, the cable anchor hub 800 includes first and second passageways 804, 806 (e.g., openings, channels, etc.) for receiving and/or securing two cable wires, such as the cable wires of the first and second cables 126, 128 (FIG. 1) associated with the front and rear suspension components 118, 120 (FIG. 1), respectively. One side of the first and second passageways 804, 806 (shown in FIG. 8) are enlarged to receive anchors (sometimes referred to as heads or ferrules) attached to the ends of the cable wires, discussed in further detail herein.

As illustrated in FIGS. 8 and 9, the curved wall 802 includes a locking feature 807 and a release feature 809, which may be different sections on the curved wall 802. The locking feature 807 interfaces with the securing mechanism 738 (FIG. 7) to lock the rotating member 714 in the second position, corresponding to the locked states of the front and rear suspension components 118, 120 (FIG. 1). The release feature 809 interfaces with the securing mechanism 738 when the rotating member 714 is in the first position, corresponding to the unlocked states of the front and rear suspension components 118, 120. In this example, the locking feature 807 is implemented by an opening 808 (e.g., a lock opening or detent) extending between an outer surface 810 and an inner surface 812 of the curved wall 802. The opening 808 is to receive the securing member 740 (FIG. 7) in the second position, as discussed in further detail in connection with FIGS. 14 and 15. As shown in FIG. 9, the release feature 809 in this example includes a groove 900 extending into the inner surface 812. The groove 900 receives the securing member 740 (FIG. 7) in the first position and any position between the first and second positions while rotating the rotating member 714. In the illustrated example, the groove 900 is separated or distanced from the opening 808 by a step 902 (e.g., a transition, a barrier, etc.). The step 902 helps to keep the securing member 740 in the opening 808, as disclosed in further detail in connection with FIGS. 14 and 15. In some examples, the release feature 809 also includes slot 814 (e.g., a slit) extending at last partially circumferentially around the rotating member 714. The slot 814 may connect to the opening 808. The slot 814 extends along a center of the groove 900. The 814 may be used to accommodate a protrusion on the release actuator 408 (FIG. 4), as disclosed in further detail herein. In the illustrated example, the rotating member 714 also includes a protrusion 816 (e.g., an extension, a projection, a nub, etc.) extending from the curved wall 802. The protrusion 816 may be for positioning or seating the biasing element 728 (FIG. 7) on the rotating member 714.

Figure 10:
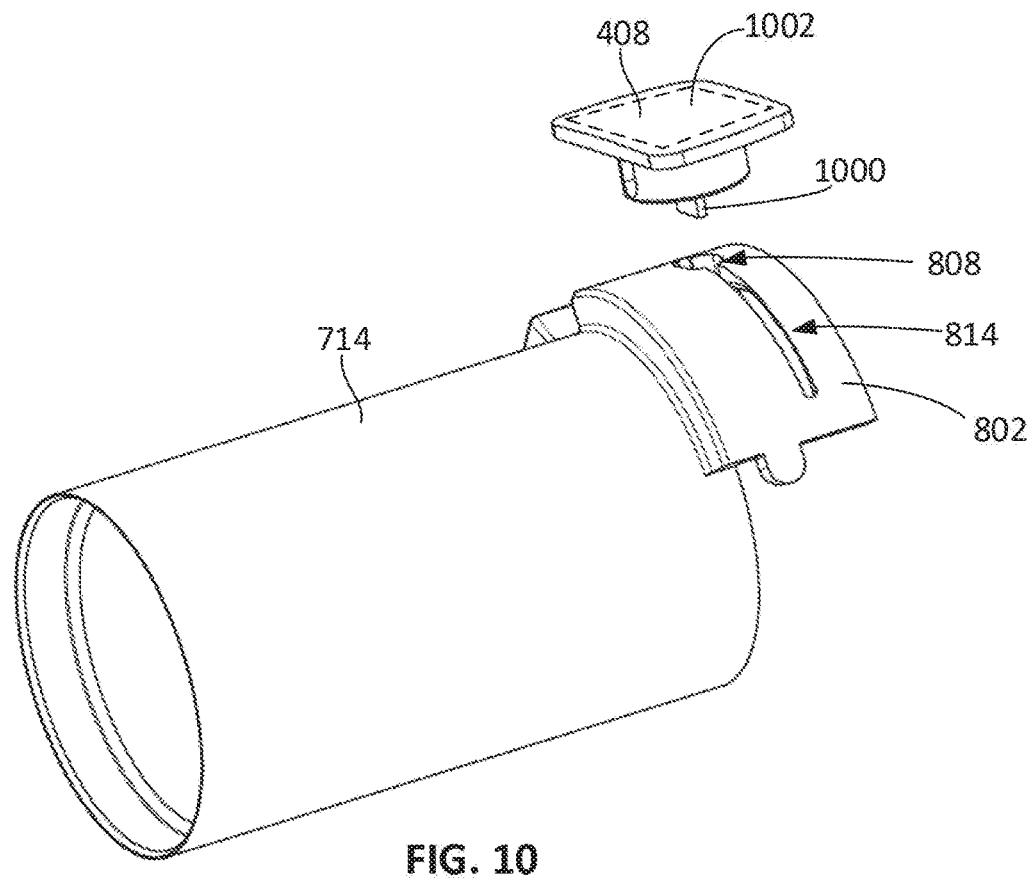
FIG. 10 shows the example rotating member of FIG. 8 and an example release actuator.

FIG. 10 shows the example release actuator 408 and the example rotating member 714. The release actuator 408 includes a protrusion 1000 (e.g., a post, tab, or fin) that fits within the opening 808 and the slot 814 on the curved wall 802 of the rotating member 714. The release actuator 408 includes an actuating surface 1002, which is the surface that may be engaged by a user (e.g., engaged by the rider's thumb) to activate the release actuator 408 and release the securing mechanism 738 (FIG. 7). The actuating surface 1002 is indicated by the dashed line. In the illustrated example, the actuating surface 1002 is partially curved or rounded, which provides a smooth surface. In other examples, the actuation surface may be substantially flat.

Figure 11:
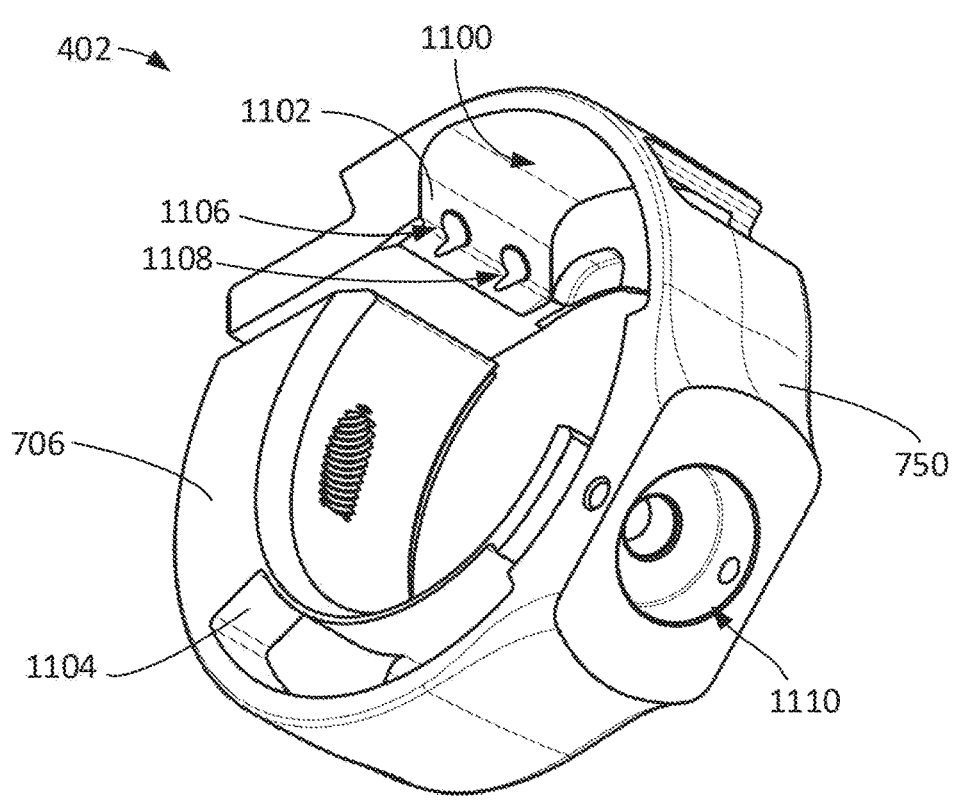
FIG. 11 is an isolated perspective view of an example housing of the example control device of FIG. 2.

Referring to FIG. 11, the housing 402 includes a cavity 1100 extending into the second side 706 of the housing 402 (e.g., in a direction along a central axis of the housing 402). The first portion 716 of the rotating member 714 (FIG. 7) fits within and is rotatable in the cavity 1100. The cavity 1100 includes a first end wall 1102 (e.g., a first stop) and a second end wall 1104 (e.g., a second stop) that limit/prevent further rotation of the rotating member 714. As shown in FIG. 11, the housing 402 includes first and second cable wire passages 1106, 1108 through which the cable wires of the first and second cables 126, 128 may be routed into the cavity 1100.

In the illustrated example, the housing 402 also includes an actuator bore 1110 to receive the release actuator 408 (FIG. 10). The actuator bore 1110 extends between the outer radial surface 750 of the housing 402 and the cavity 1100 within the housing 402. When the release actuator 408 is disposed in the actuator bore 1110, the protrusion 1000 (FIG. 10) extends into the cavity 1100.

Figure 12:
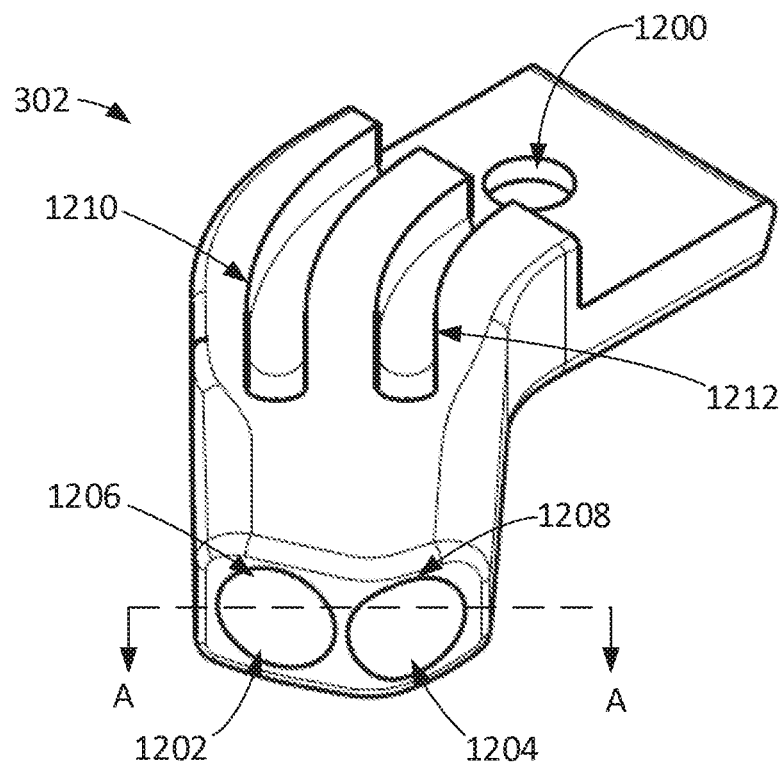
FIG. 12 is an isolated perspective view of an example cable guide of the example control device of FIG. 2.
Figure 13:
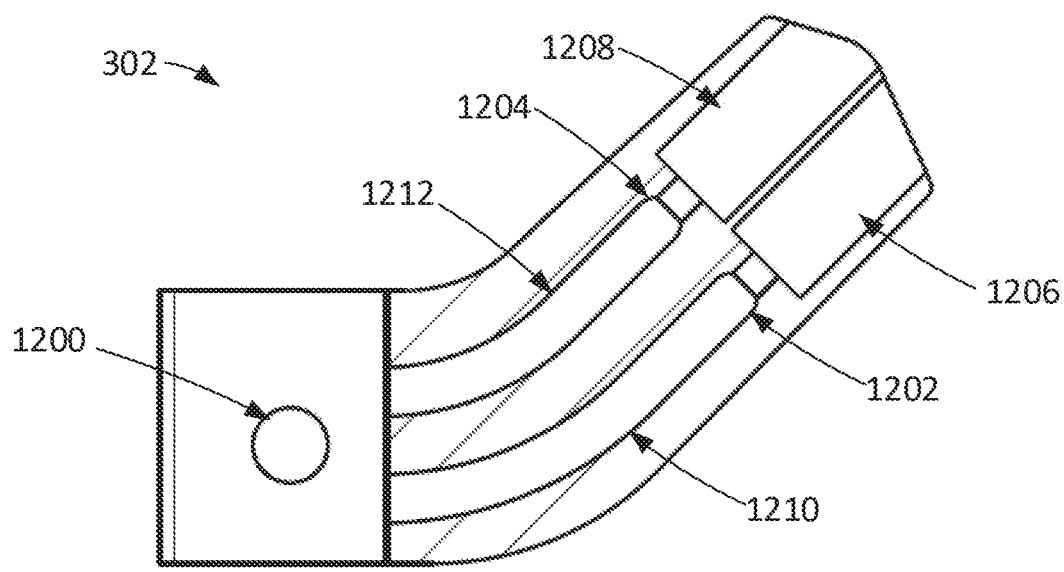
FIG. 13 is a cross-sectional view of the example cable guide taken along line A-A in FIG. 12.

FIG. 12 is a bottom view of the cable guide 302 and FIG. 13 is a cross-sectional view of the cable guide 302 taken along line A-A from FIG. 12. As disclosed above, the cable guide 302 may be coupled to the housing 402 (FIG. 7) and used to guide or direct the cable(s) of the bicycle component(s) away from the housing 402 (e.g., so as not to intersect or interfere with other devices on the handlebars). The cable guide 302 includes an opening 1200 through which the threaded fastener 406 (FIG. 7) may be inserted to couple the cable guide 302 to the housing 402. In the illustrated example, the cable guide 302 includes first and second cable passageways 1202, 1204. The first and second cable passageways 1202, 1204 include larger diameter portions 1206, 1208, respectively, and smaller diameter portions 1210, 1212, respectively. The cable casings of the first and second cables 126, 128 may be inserted into the larger diameter portions 1206, 1208, for example, and the cable wires of the first and second cables 126, 128 extend through the smaller diameter portions 1210, 1212, respectively, and into the housing 402. In particular, when the cable guide 302 is coupled to the housing 402, the smaller diameter portions 1210, 1212 are aligned with the first and second cable wire passages 1106, 1108 (FIG. 11), respectively, to enable the cable wires to pass into/out of the cavity 1100 of the housing 402.

FIGS. 14 and 15 are cross-sectional views of the control device 200 taken along line B-B of FIG. 5. FIG. 14 shows the rotating member 714 (and, thus, the grip 404 (FIG. 7)) in the first position and FIG. 15 shows the rotating member 714 (and, thus, the grip 404) in the second position. The first position may correspond to the unlocked states of the front and rear suspension components 118, 120 (FIG. 1), and the second position may correspond to the locked states of the front and rear suspension components 118, 120.

Referring to FIG. 14, the body tube 708 is disposed within the opening 700 of the housing 402. The body tube 708 may be disposed on the left handlebar 300 (shown in dashed lines), for example. In some examples, the housing 402 operates as a clamp to clamp the control device 200 onto the left handlebar 300. For example, the housing 402 includes a split or gap 1400 in the body of the housing 402. As such, the housing 402 does not form a continuous circle or ring. The gap 1400 enables the housing 402 to be deformed or compressed radially inward, thereby decreasing the diameter of the opening 700 of the housing 402. In the illustrated example, the threaded fastener 406 is disposed in a threaded opening 1402 (e.g., a threaded bore) that extends into the housing 402 and across the gap 1400. The threaded fastener 406 may be tightened to decrease the gap 1400 and, thus, deform the housing 402 radially inward onto the left handlebar 300. To remove the control device 200 from the left handlebar 300 or reposition the control device 200 on the left handlebar 300, the threaded fastener 406 may be loosened, which enables the gap 1400 to expand and, thus, increases the diameter of the opening 700. Because the housing 402 (which contains or houses many of the actuating components) acts as a clamp, a separate clamp ring is not required to connect the example control device 200 to a handlebar, which is typically required in known control devices. As such, the control device 200 takes up less space on the handlebar than known control devices that require additional clamp rings. Additionally, the example control device 200 utilizes fewer components and, thus, is less expensive to manufacture than known control devices.

The first and second cables 126, 128 (only the first cable 126 is shown in FIG. 14) extend into the cable guide 302. As disclosed above, the first and second cables 126, 128 include cable wires (sometimes referred to as inner cables) disposed within cable casing (sometimes referred to as liners). A cable wire 1404 and a casing 1406 of the first cable 126 are shown in FIG. 14. The cable wire 1404 is coupled to the rotating member 714 in the cavity 1100 of the housing 402. In this example, the cable wire 1404 is coupled to the cable anchor hub 800 of the rotating member 714. To connect the cable wire 1404 to the cable anchor hub 800, the cable wire 1404 may be inserted through the opening 748 in the housing 402. For example, the cap 752 may be removed from the opening 748, and the cable wire 1404 may be inserted into the cavity 1100, routed through the first passageway 804 in the rotating member 714, through the first cable wire passageway 1106 (FIG. 11) in the housing 402, and through first cable passageway 1202 in the cable guide 302. The end of the cable wire 1404 includes an anchor 1408 (e.g., a head or ferrule) that sits within the enlarged opening in the first passageway 804 of the rotating member 714 and prevents the cable wire 1404 from being pulled through the first passageway 804. The casing 1406 may be fed onto the opposite end of the cable wire 1404 (and into the larger diameter portion 1206 (FIG. 12) of the first cable passageway 1202). Although not shown, the cable wire from the second cable 128 (FIG. 1) may be similarly attached to the rotating member 714 via the second passageway 806. In the illustrated example, the wire guide 754 is disposed between the first and second passageways 804, 806 in the rotating member 714 and the first end wall 1102 of housing 402. The wire guide 754 includes the first and second grooves 756, 758 (FIG. 7) for guiding the cable wires. The wire guide 754 is coupled to the housing 402 and does not rotate with the rotating member 714. As the rotating member 714 rotates, the cable wire(s) slide along groove(s) in the wire guide 754.

As illustrated in FIG. 14, the first portion 716 of the rotating member 714 is disposed in the cavity 1100 formed in the housing 402. The rotating member 714 is rotatable about the rotational axis 410 (which extends into the page in FIG. 14). In this example, the rotational axis 410 is also aligned with the central axes of the left handlebar 300, the body tube 708, the housing 402, and the rotating member 714. In other words, the central axes of all of these components are coaxial with the rotational axis 410. The rotating member 714 is rotatable on the body tube 708 via the first friction reducing device 720 and the second friction reducing device 722 (FIG. 7). In the first position shown in FIG. 14, the cable anchor hub 800 of the rotating member 714 is engaged with the first end wall 1102 in the cavity 1100. The biasing element 728 biases the rotating member 714 toward the first position (e.g., in the clockwise direction in FIG. 14) and into the first end wall 1102. In the illustrated example, the biasing element 728 is disposed between the second end wall 1104 in the cavity 1100 and the curved wall 802 of the rotating member 714. The biasing element 728 may be coupled to the curved wall 802 at the protrusion 816.

As illustrated in FIG. 14, the securing member 740 and the biasing element 742 are disposed within a bore 1410 (e.g., a pocket) formed in the housing 402. In this example, the bore 1410 extends between the cavity 1100 and a spring receiving feature 1411 (e.g., a groove or indentation) on the inner surface 702 of the housing 402. The biasing element 742 is backed against the body tube 708 and biases the securing member 740 outward (e.g., in a direction radially outward from the rotational axis 410). In the illustrated example, the slot 814 in the curved wall 802 is disposed over or aligned with the bore 1410. As such, the securing member 740 is biased into the groove 900 formed on the inner surface 812 of the curved wall 802 of the rotating member 714. In the illustrated example, the protrusion 1000 on the release actuator 408 extends through the slot 814 and is engaged with the securing member 740. The biasing element 742 biases the securing member 740 outward, which biases the release actuator 408 outward (radially outward). In other words, the biasing element 742 provides the biasing means to return the release actuator 408 to the outward position (which gives the release actuator 408 a relatively firm feel when pushing the release actuator 408 inward). The release actuator 408 is moveable into the actuator bore 1110 along a release axis 1412 that intersects the rotational axis 410. In this example, the release axis 1412 is perpendicular to the rotational axis 410. The release actuator 408 is held in the actuator bore 1110 of the housing 402 via the pin 744. In particular, the pin 744 extends through a pin opening 1414 in the release actuator 408. The pin opening 1414 is elongated, which enables the release actuator 408 to move a defined distance in either direction along the release axis 1412. In some examples, the release actuator 408 has a travel distance of about one millimeter (mm). In other examples, the pin opening 1414 may be longer or shorter to enable a larger or smaller travel distance. The release actuator 408, the securing member 740 and the biasing element 742 are all aligned along the release axis 1412.

To pull the cable wires (e.g., the cable wire 1404) and change the operating states of the front and rear suspension components 118, 120 from the unlocked state to the locked state, the rotating member 714 may be rotated in the counter-clockwise direction in FIG. 14. For example, a rider may rotate the grip 404 (FIG. 4) (and, thus, the rotating member 714) counter-clockwise, which rotates the first portion 716 of the rotating member 714 (in the counter-clockwise direction in FIG. 14) in the cavity 1100. As the first portion 716 rotates in the cavity 1100 of the housing 402, the securing member 740, which is disposed in the bore 1410 and biased into the rotating member 714, interfaces with the locking and release features 807, 809. For example, when rotating between the first and second positions, the securing member 740 rolls and/or slides along the groove 900 on the inner surface 812 of the curved wall 802. In this example, the release feature 809 also includes the slot 814, which enables the protrusion 1000 on the release actuator 408 to remain engaged with the securing member 740 as the rotating member 714 rotates. In other words, the protrusion 1000 travels within the slot 804 as the rotating member 714 rotates.

As the rotating member 714 rotates, the cable wires (e.g., the cable wire 1404) are pulled (translated), thereby switching the front and rear suspension components 118, 120 to their locked states. As shown in FIG. 15, once the opening 808 in the curved wall 802 of the rotating member 714 is aligned with the bore 1410, the securing member 740 is moved (via the bias of the biasing element 742) radially outward (relative to the rotational axis 410) and into the opening 808 in the curved wall 802. When the securing member 740 is disposed in the opening 808 in the curved wall 802, the rotating member 714 is locked or secured in place, which corresponds to the second position. As a result, the cable wires (e.g., the cable wire 1404) are locked and, thus, the front and rear suspension components 118, 120 (FIG. 1) are held in their locked state. Therefore, in this example, the control device 200 operates to hold the cable wires at two positions: the first position in which first portion 716 of the rotating member 714 is engaged with the first end wall 1102 (FIG. 14), which prevents further rotation of the rotating member 714 in a first direction (the clockwise direction), and the second position where first portion 716 of the rotating member 714 is near or engaged with the second end wall 1104 (FIG. 15) and rotating member 714 is locked by the securing mechanism 738, which prevents further rotation of the rotating member 714 in a second direction (the counter-clockwise direction) opposite the first direction. When the rotating member 714 is in the second position (FIG. 15), the opening 808 in the curved wall 802 is aligned with the bore 1410 and, when the rotating member 714 is in the first position (FIG. 14), the opening 808 in the curved wall 802 is not aligned with the bore 1410. FIG. 15 shows the angular rotation θ between the first position and the second position. In some examples, the angular rotation θ of the rotating member 714 between the first position and the second position is 45° or less. In other examples, the angular rotation between the first and second positions may be larger or smaller, for example, depending on the desired length of cable to be pulled, the diameter of the handlebar, etc.

FIG. 16 is an enlarged view of the securing member 740 and the rotating member 714 from FIG. 15. As shown in FIG. 16, the securing member 740 is disposed partially in the bore 1410 and partially in the opening 808 of the curved wall 802, which prevents the rotating member 714 from rotating back to the first position (in the clockwise direction in FIG. 16). In particular, the securing member 740 is wedged between a leading edge 1600 of the opening 808 and a front edge 1602 of the bore 1410. The dotted line in FIG. 16 represents the line of force acting through the securing member 740 between the leading edge 1600 of the opening 808 and the front edge 1602 of the bore 1410. In the illustrated example, the securing member 740 is prevented from moving further outward by the release actuator 408 (e.g., via the pin 744).

In this example, the securing member 740 is implemented as a ball or sphere. The ball can roll and slide against the inner surface 812 of the rotating member 714 to interface with the locking feature 807 and the release feature 809 (FIG. 8). In other examples, the securing member 740 may be implemented as another structure, such as a pin with a rounded tip (e.g., a hemispherical tip), which would operate in substantially the same manner as a ball. In other examples, the securing member 740 may have other shapes.

Referring back to FIG. 15 (and also shown in FIGS. 8 and 9), in this example, the opening 808 in the curved wall 802 is elongated or oval shaped (e.g., is larger than the diameter of the securing member 740 in one direction). As such, the rotating member 714 can be rotated slightly beyond the position shown in FIG. 15 until the rotating member 714 (e.g., the protrusion 816) contacts the second end wall 1104 in the cavity 1100 of the housing 402. At this point, when the rider cannot further rotate the rotating member 714, the rider releases the rotating member 714 and the rotating member 714 rotates slightly backward (e.g., via the biasing element 728) to the position shown in FIG. 15, where the securing member 740 prevents rotation of the rotating member 714 back to the first position. This over-rotation enables the rotating force provided by the rider to be applied to the second end wall 1104 in the cavity 1100 rather than the securing member 740. For instance, if the opening 808 in the rotating member 714 was the substantially the same diameter as the securing member 740, then the securing member 740 would slide into the opening 808 as the opening 808 aligns with the bore 1410 and rider may continue to provide rotating force to the rotating member 714 that could inadvertently shear, damage, and/or jam the securing member 740. Therefore, the oversized opening 808 enables the rotating member 714 to be rotated slightly beyond the position shown in FIG. 15 to where the rotating member 714 engages the second end wall 1104 of the housing 402 or is otherwise prevented from further rotation (e.g., because the biasing element 728 is full compressed). As such, in this example, the second position in which the rotating member 714 is locked is not the furthest rotatable position. However, in other examples, the rotating member 714 may be configured to engage the second end wall 1104 (and/or be prevented from further rotation by the biasing element 728) just as the securing member 740 slides into the opening 808. Thus, in some examples, the opening 808 may be substantially the same diameter as the securing member 740.

To unlock or release the rotating member 714 and enable the rotating member 714 to rotate back to the first position (the position in FIG. 14), the release actuator 408 may be actuated to release the securing mechanism 738. In this example, the release actuator 408 may be actuated by moving the release actuator 408 radially inward along the release axis 1412. For example, a rider may engage or press the actuating surface 1002 and move the release actuator 408 inward. When the release actuator 408 is translated radially inward, the protrusion 1000 pushes the securing member 740 back into the bore 1410. When the securing member 740 is clear of the opening 808 in the curved wall 802 (e.g., over the step 902 on the inner surface 812 between the opening 808 and the groove 900), the rotating member 714 is free to rotate back to the first position (in the clockwise direction in FIG. 15). As the rotating member 714 rotates back to the first position, the securing member 740 slides over the step 902 and back into the groove 900 on the inner surface 812 of the curved wall 802. The release of the securing mechanism 738 is generally independent of the tension in the cable wires and, thus, only a minimal pressure is needed on the release actuator 408. The securing mechanism 738 also operates with minimal drag. While in this example the release feature 809 includes the groove 900 on the inner wall 812 of the rotating member 714, in other examples the groove 900 may not be included. Instead, the inner wall 812 may be substantially flat. In such an example, the control device 200 would operate substantially the same. However, the securing member 740 may not contact the release actuator 408 to bias the release actuator 408 radially outward while the rotating member 714 is between the first and second positions. Further, in such examples, the slot 814 may be shorter, and may only extend a short length from the opening 808 (e.g., enough to enable the protrusion 1000 to push the securing member 740 back into the bore 1410 and clear the step 902.

As mentioned above, in some examples, the rotating member 714 is biased toward the first position (in the counter-clockwise direction in FIG. 15) via the biasing element 728. Additionally or alternatively, in some examples, the tension in the cable wire(s) and/or the lockout mechanism of the front and rear suspension components 118, 120 (FIG. 1) may bias the rotating member 714 back to the first position. Therefore, in some examples, the biasing element 728 is not included in the control device 200. Instead, the rotating member 714 is returned to the first position under the tension of the cable wires.

As understood from FIGS. 14-16, the movement of the release actuator 408 is relatively small (e.g., defined by the distance of the pin opening 1414). In some examples, the release actuator 408 is only required to move a distance of around one millimeter (mm) to push the securing member 740 and release the rotating member 714. Further, only the initial part of the movement is needed to release the rotating member 714. More specifically, once the securing member 740 is moved slightly inward from the position shown in FIGS. 15 and 16, the leading edge 1600 (FIG. 16) of the rotating member 714 (which is biased via the biasing element 728) pushes against the curved surface of the securing member 740 and forces the securing member 740 radially inward and back into the bore 1410. As such, only a small pressure is needed to be applied to the release actuator 408 and the rotating member 714 takes over and quickly returns to the first position. As such, only a very small pressure and/or movement of the rider's thumb is needed to press the release actuator 408 to release or unlock the control device 200, unlike known control devices that require relatively large forces and often require the user to significantly readjust his/her hand.

In some examples, one or more indicators may be provided on the control device 200 to indicate to a rider the position of the grip 404 of the control device 200 and, thus, indicate the operating state of the associated bicycle component(s). For example, referring to FIG. 14, indicia may be formed on the rotating member 714 and viewable through the opening 748 in the outer radial surface 750 of the housing 402 (assuming the cap 752 is removed). Depending on the position of the rotating member 714 in the housing 402, one or more indicia may be viewable through the opening 748. For example, indicia may be formed on the outer surface of the cable anchor hub 800 of the rotating member 714. The indicia may be a picture of a lock-pad or the letter "L," for example. As shown in FIG. 14, when the rotating member 714 is in the first position, the cable anchor hub 800 is not aligned with the opening 748. However, when the rotating member 714 is rotated to the second position, as shown in FIG. 15, the outer surface of the cable anchor hub 800 is aligned with the opening 748 and, thus, the indicia is visible through the opening 748. In other words, when the rotating member 714 is in the first position, the indicia is not visible, but when the rotating member 714 is in the second position, the indicia is aligned with and viewable through the opening 748. For example, as shown in FIG. 3, an indicia 304 (the letter "L") is viewable through the opening on the control device 200, thereby indicating the front and rear suspension components 118, 120 are in their locked "L" operating states. In other examples, indicia may be provided on other parts of the rotating member 714 and/or any other part of the control device 200. For example, in addition to or as an alternative to the indicia on the cable anchor hub 800, other indicia (e.g., a picture of an unlocked lock-pad or the letters "UL") may be provided a surface of the rotating member 714 that is viewable through the opening 748 when the rotating member 714 is in the first position. The indicia may be any character, symbol, picture, color, etc., which may be disposed on and/or etched into a surface.

Figure 17:
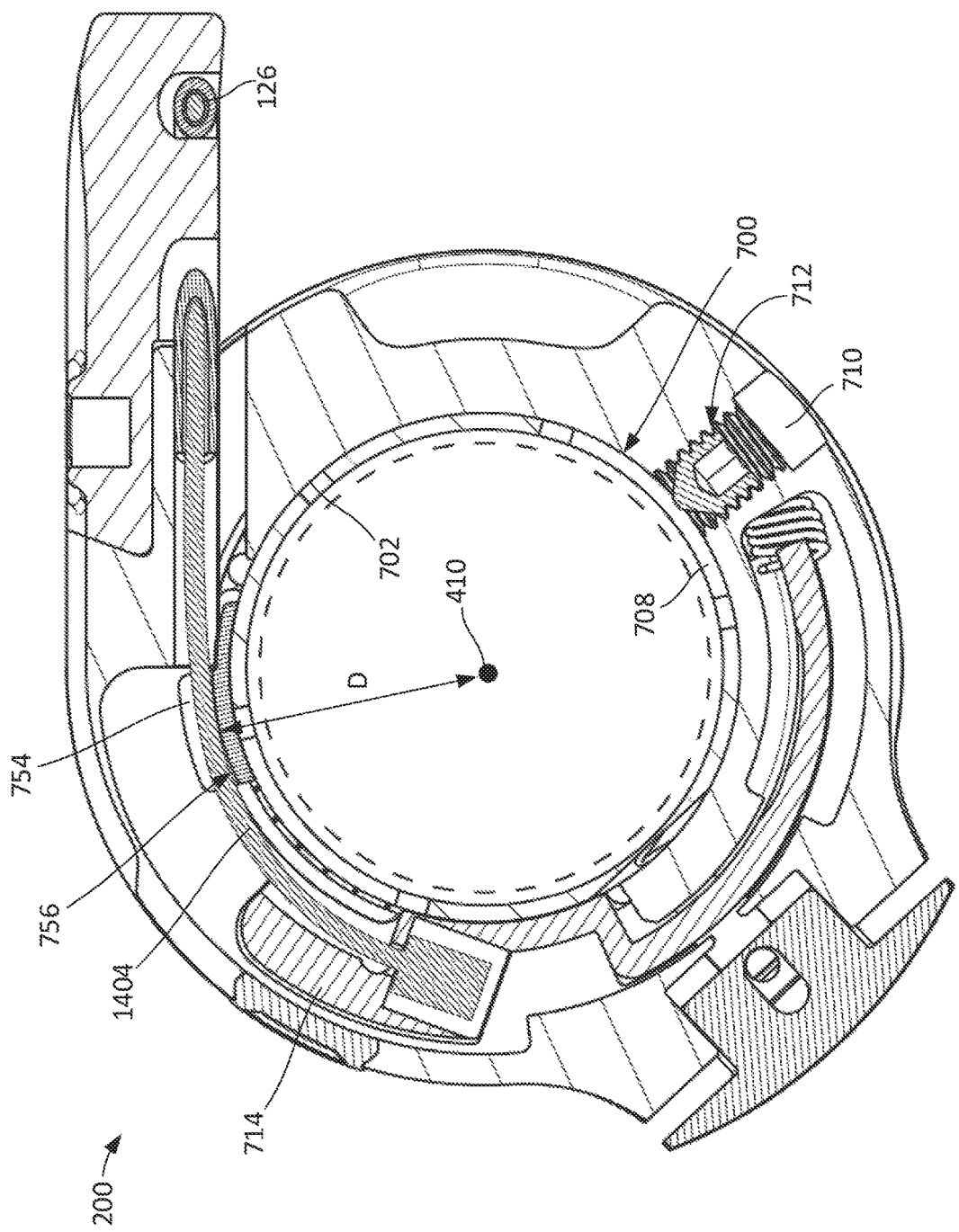
FIG. 17 is a cross-sectional view of the example control device taken along line C-C of FIG. 5.

FIG. 17 is a cross-sectional view of the example control device 200 taken along line C-C of FIG. 5. In FIG. 17, the rotating member 714 is in the second position (which corresponds to the locked states of the front and rear suspension components 118, 120 (FIG. 1)). As shown, the cable wire 1404 of the first cable 126 is routed through the wire guide 754. The cable wire 1404 slides along the first groove 756 in the cable wire guide 754 as the rotating member 714 rotates in either direction. The wire guide 754 includes a similar groove (the second groove 758 (FIG. 7)) for the cable wire of the second cable 128. In the illustrated example, the cable wires are separated from the rotational axis 410 by a distance D, which is the distance between the innermost surface of the grooves in the wire guide 754 and the rotational axis 410. In this example, the wire guide 754 enables the cable wires to remain relatively close to the inner surface 702 of the housing 402 and, thus, minimizes the distance between the cable wires and the rotational axis 410. By keeping the cable wires close to the rotational axis 410, the radial profile of the control device 200 can be minimized, and ergonomic actuation may be improved. In an embodiment, the distance D is less than 20 mm to accommodate ergonomic performance. For example, the distance D is 15 mm or less to maintain the radially compact nature of the control device 200 relative to the handlebar. This small distance enables a relatively small rotational angle. For instance, as disclosed above, in some examples, the angular rotation θ (FIG. 15) between the first and second positions is only about 45°, which is relatively small compared to known control devices. In other examples, the distance D may be greater or smaller than 15 mm.

Also illustrated in FIG. 17 is the threaded opening 712 and the threaded fastener 710. The threaded fastener 710 may be threaded into the threaded opening 712 such that a tip of the threaded fastener 710 contacts the body tube 708, which acts to couple the body tube 708 and the housing 402 and prevents the body tube 708 from moving (e.g., sliding axially along the handlebar and out of the opening 700 of the housing 402). In some examples, the body tube 708 includes a small opening or recess to receive the tip of the threaded fastener 710.

Figure 18:
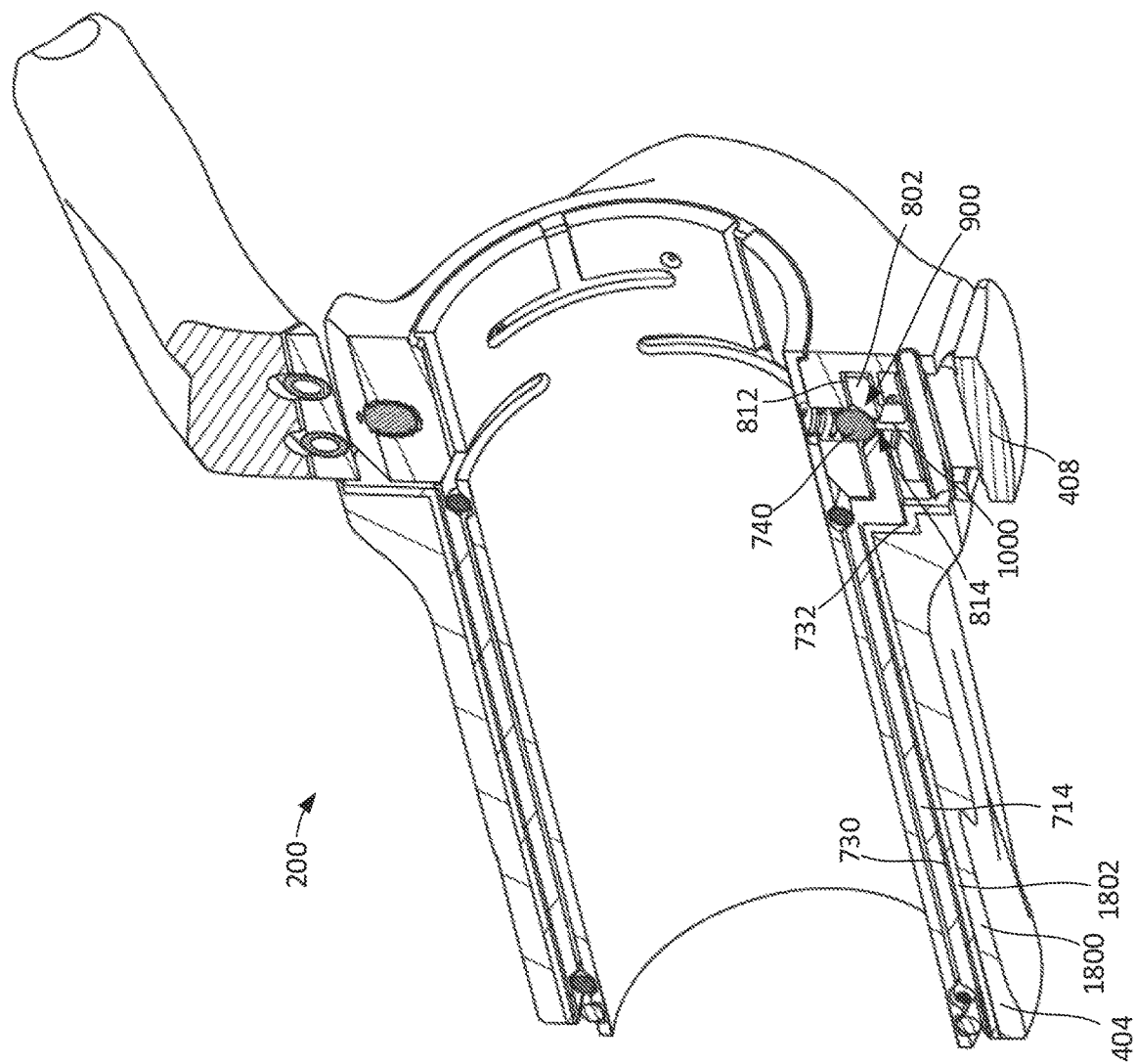
FIG. 18 is a cross-sectional view of the example control device taken along line D-D of FIG. 6.

FIG. 18 is a cross-sectional view of the control device 200 taken along line D-D of FIG. 6. In FIG. 18, the rotating member 714 is in the first position. As shown, the securing member 740 is seated in the groove 900 formed on the inner surface 812 of the curved wall 802 of the rotating member 714. The protrusion 1000 on the release actuator 408 extends through the slot 814 and is engaged with the securing member 740, which is biasing the release actuator 408 radially outward.

In some examples, the grip 404 is constructed of a first portion 1800 and a second portion 1802. In some examples, the first portion 1800 is constructed of a lower durometer material than the second portion 1802. For example, the first portion 1800 may be constructed of an elastomeric material, and the second portion 1802 may be constructed of hard plastic. In the illustrated example, the second portion 1802 defines the inner surface 730 and the first end 732 of the grip 404. The second portion 1802 is in contact with the rotating member 714. In other examples, the second portion 1802 may be embedded in the first portion 1800.

Figure 19:
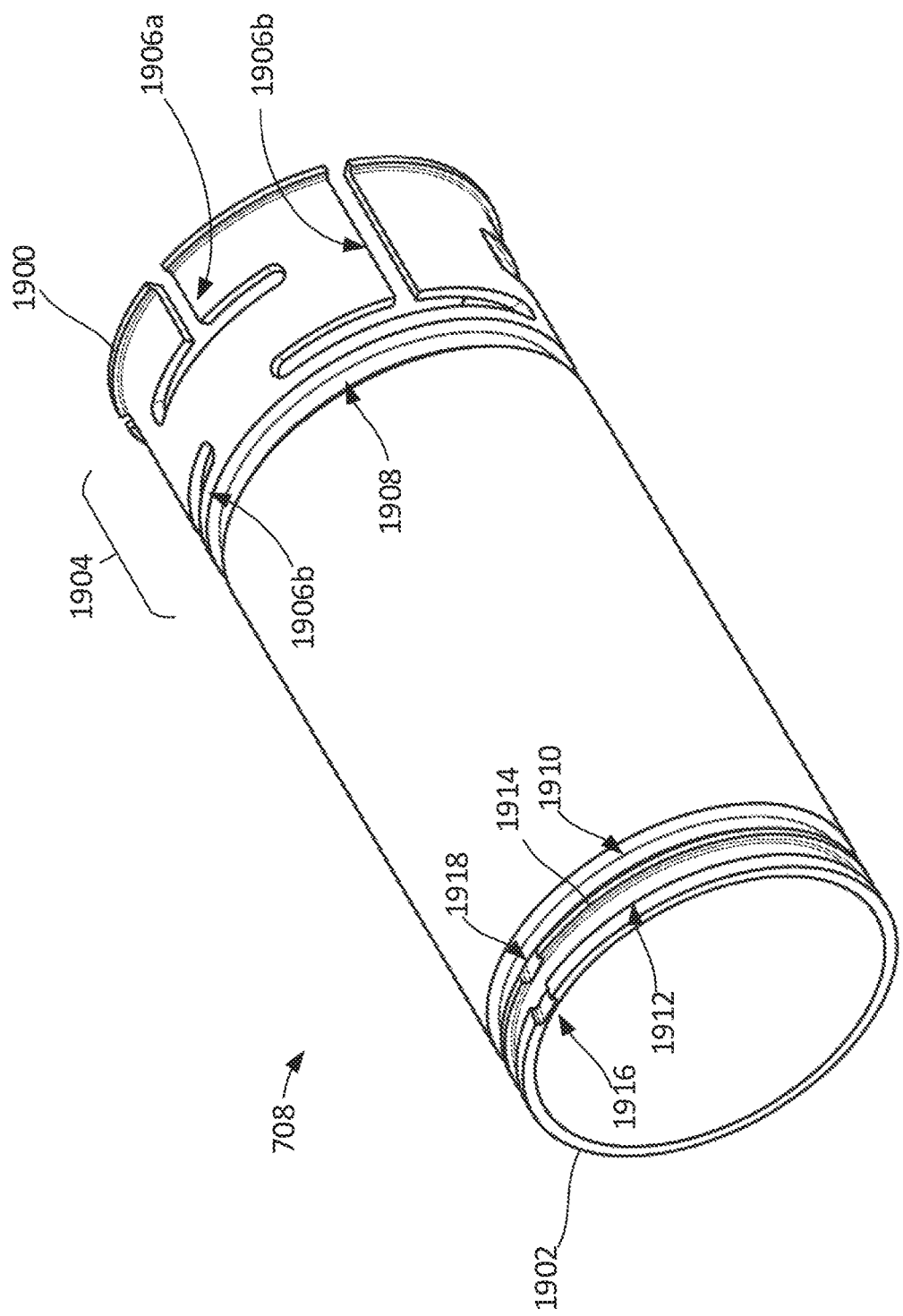
FIG. 19 is an isolated perspective view of an example body tube of the example control device of FIG. 2.
Figure 20:
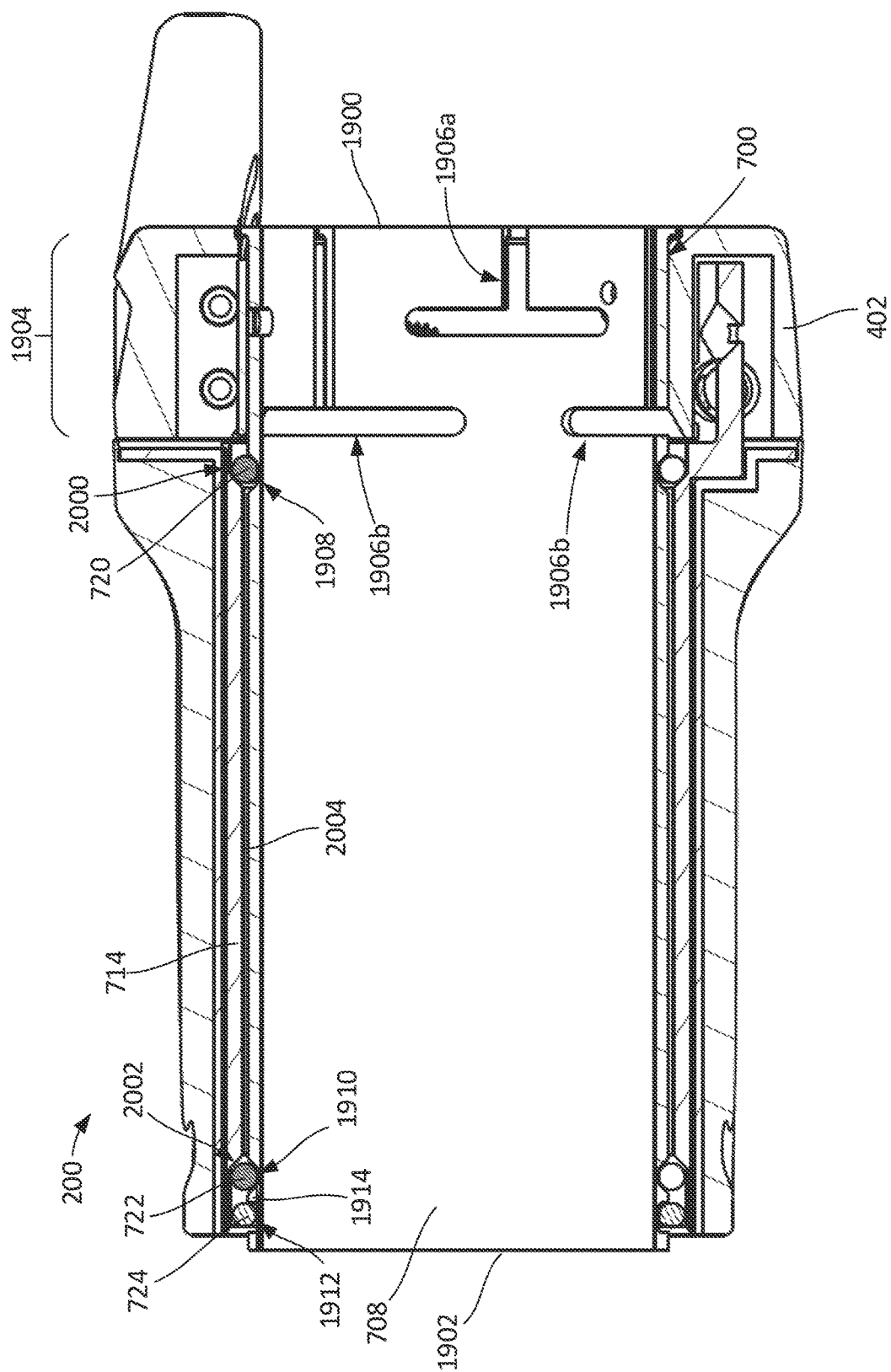
FIG. 20 is a cross-sectional view of the example control device taken along line E-E of FIG. 6.

FIG. 19 is an isolated perspective view of the body tube 708 and FIG. 20 is a cross-sectional view of the control device 200 taken along line E-E in FIG. 6. The body tube 708 has a first end 1900 and a second end 1902 opposite the first end 1900. When the control device 200 is assembled, a section 1904 of the body tube 708 near the first end 1900 is disposed within the opening 700 of the housing 402.

As shown in FIGS. 19 and 20, the section 1904 of the body tube 708 includes a plurality of first slots 1906a and second slots 1906b that extend into the body tube 708 (in an axial direction) from the first end 1900 and branch out in a circumferential direction around the body tube 708. In the illustrated example, the first slots 1906a extend less into the length of the body tube 708 than the second slots 1906b. This arrangement of the slots 1906a, 1906b divides the section 1904 of the body tube 708 into fingers that can bend or flex radially inward (e.g., toward the central axis of the handlebar) as the housing 402 is clamped onto the left handlebar 300 (FIG. 3). The slots 1906a, 1906b also reduce stress that would otherwise be created on the body tube 708 if the housing 402 was clamped onto the body tube 708 and no slots were provided. In the illustrated example, the first slots 1906a and the second slots 1906b alternate around the circumference of the body tube 708. In other examples, other designs or patterns of slots may be implemented.

In the illustrated example of FIGS. 19 and 20, the body tube 708 includes a first bearing groove 1908 (e.g., a bearing track or channel) and a second bearing groove 1910 that are to receive the first and second bearings 720, 722 (FIG. 7), respectively. The first and second bearings 720, 722 enable the rotating member 714 to rotate smoothly on the body tube 708 (e.g., circumferentially around the body tube 708 and, thus, around the handlebar). In the illustrated example, the first bearing groove 1908 is located near the section 1904 and the second bearing groove 1910 is located near the second end 1902 of the body tube 708. In other examples the first and/or second bearing grooves 1908, 1910 may be located in other positions along the body tube 708.

In the illustrated example, the body tube 708 includes a seal groove 1912 disposed between the second bearing groove 1910 and the second end 1902 of the body tube 708. A rib 1914 is formed between the second bearing groove 1910 and the seal groove 1912. The seal groove 1912 is to receive the seal 724, which is used to retain the balls of the second bearing 722 in the second bearing groove 1910. As shown in FIG. 20, the rotating member 714 includes a first bearing groove 2000 and a second bearing groove 2002 formed on an inner surface 2004 of the rotating member 714. The first and second bearing grooves 2000, 2002 of the rotating member 714 are substantially aligned with the first and second bearing grooves 1908, 1910, respectively, in the body tube 708 to form tracks or races for the respective first and second bearings 720, 722 (FIG. 7). In some examples, grease or another lubricant is inserted into the tracks or races.

To insert the balls of the second bearing 722 the second bearing groove 1910 during assembly of the control device 200, the body tube 708 includes a first channel 1916 (e.g., a notch) in the second end 1902 of the body tube 708 and a second channel 1918 in the rib 1914, as shown in FIG. 19. For example, when assembling the control device 200, the rotating member 714 may be slid onto the body tube 708 (e.g., in an axial direction). Then, the balls of the second bearing 722 can be inserted (e.g., one at a time) through the first and second channels 1916, 1918 into the second bearing groove 1910 between the rotating member 714 and the body tube 708. Then, the seal 724 can then be inserted into the seal groove 1912 (e.g., by expanding the seal 724 radially outward and pushing it in the seal groove 1912), which prevents the ball bearings from escaping the second bearing groove 1910. The seal 724 may also be used to prevent debris (e.g., dirt, sand, etc.), water, and/or other unwanted material from entering the space between the rotating member 714 and the body tube 708, which could otherwise adversely affect the operation of the control device 200. The balls of the first bearing 720 may be inserted into the first bearing grooves 1908, 2000 through the cavity 1100 (FIG. 11) in the housing 402 prior to installing the wire guide 754 (FIG. 7) and the grip 404.

FIG. 21 is an enlarged view of the first bearing 720 shown in FIG. 20 disposed between the rotating member 714 and the body tube 708. In the illustrated example, the first bearing groove 1908 of the body tube 708 and the first bearing groove 2000 of the rotating member 714 form a first bearing race or track 2100 for the balls of the first bearing 720. In the illustrated example, the first bearing groove 1908 in the body tube 708 includes a first horizontal surface 2102, which is parallel to a central axis of the body tube 708, and a first angled surface 2104, which is angled (e.g., 45°) with respect to the first horizontal surface 2102. Similarly, the first bearing groove 2000 in the rotating member 714 includes a second horizontal surface 2106 and a second angle surface 2108, which faces the first angled surface 2104 (e.g., is parallel to the first angled surface 2104). Rather than rolling on opposing horizontal walls between two vertical walls, the balls of the first bearing 720 are disposed between and rotate/slide along the first and second angled surfaces 2104, 2108. By forming the first bearing track 2100 between the first and second angled surfaces 2104, 2108, the manufacturing tolerances of the first bearing grooves 1908, 2000 can be lowered. In particular, if the first bearing track 2100 was defined by two opposing vertical walls and two opposing horizontal walls, the dimensions between the walls would need to be extremely precise to form a narrow track for the balls (otherwise the balls may bind, drag, and/or rattle). However, by trapping the balls between the angled surfaces 2104, 2108, the tolerances can be relaxed. Also, the second bearing grooves 1910, 2002 (FIG. 20) of the body tube 708 and the rotating member 714 include similar angled surfaces in the opposite direction. As a result, the balls of the first bearing 720 and the balls of the second bearing 722 help to align and center the rotating member 714 on the body tube 708, because each of the bearings bias the rotating member 714 in the opposite direction.

From the foregoing, it will be appreciated that the above disclosed control devices are operable to actuate one or more bicycle component(s) in a comfortable and easy-to-operate manner. The example control devices utilize a rotating grip that enables a rider to keep his/her hand relatively close to the handlebar while actuating the bicycle component(s). The rotating grip is also easier to rotate and enables a rider to provide more leverage to the control device, which can be used to active two or more bicycle components simultaneously. Further, the example control devices utilize a release actuator that is disposed near a location of the rider's thumb, which enables a rider to unlock or release a securing mechanism to switch between operating states.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A control device for changing an operating state of a component of a bicycle, the control device comprising:
   a housing having an opening to receive a handlebar of the bicycle;
   a rotating member rotatably coupled to the housing, the rotating member rotatable about a first axis, the rotating member configured to rotate between a first position and a second position to change the operating state of the component between a first state and a second state, respectively;
   a securing mechanism configured to lock the rotating member in the second position; and
   a release actuator coupled to the housing, the release actuator having an actuating surface to be engaged by a user and moved along a second axis that intersects the first axis, the release actuator configured to, when actuated, unlock the securing mechanism to enable the rotating member to rotate back to the first position.

2. The control device of claim 1, wherein a first portion of the rotating member is disposed within a cavity in the housing and a second portion of the rotating member extends axially outward from the housing.

3. The control device of claim 2, wherein, in the first position, the first portion of the rotating member is engaged with a first end wall in the cavity of the housing that prevents further rotation of the rotating member in a first direction and, in the second position, the first portion of the rotating member is near or engaged with a second end wall in the housing that prevents further rotation of the rotating member in a second direction opposite the first direction.

4. The control device of claim 3, wherein an angular rotation of the rotating member between the first position and the second position is 45° or less.

5. The control device of claim 2, further including a grip coupled to an outer surface of the second portion of the rotating member.

6. The control device of claim 5, wherein the grip includes a keyed opening to mate with the first portion of the rotating member.

7. The control device of claim 2, wherein the opening is a first opening, and wherein the first portion of the rotating member includes a second opening extending between an outer surface and an inner surface of the rotating member, wherein the securing mechanism includes a securing member engaged with the inner surface of the first portion of the rotating member, and wherein, when the rotating member is in the second position, the securing member is biased into the second opening and prevents the rotating member from rotating to the first position.

8. The control device of claim 2, wherein the opening is a first opening, wherein the housing includes a second opening in an outer surface of the housing extending into the cavity, and wherein an outer surface of the first portion of the rotating member includes indicia, the indicia not viewable through the second opening when the rotating member is in the first position and the indicia being viewable through the second opening when the rotating member is in the second position.

9. The control device of claim 1, wherein the housing is deformable to clamp onto the handlebar of the bicycle.

10. The control device of claim 9, wherein the housing includes a threaded bore to receive a threaded fastener to deform the housing to clamp the housing onto the handlebar of the bicycle.

11. The control device of claim 1, further including a biasing element disposed within the housing and engaged with the rotating member to bias the rotating member toward the first position.

12. The control device of claim 1, wherein the housing includes a wire guide having a groove to receive a cable wire of the component, an innermost surface of the groove being less than 15 mm from the first axis.

13. A control device for changing an operating state a component of a bicycle, the control device comprising:
 a housing having a first opening to receive a handlebar of the bicycle;
 a rotating member coupled to the housing, the rotating member movable between a first position and a second position to change the operating state of the component between a first state and a second state, respectively, the rotating member including a second opening extending between an inner surface and an outer surface of the rotating member;
 a securing member disposed in the housing and biased toward the inner surface of the rotating member, the securing member to be disposed in the second opening when the rotating member is in the second position to lock the rotating member in the second position; and
 a release actuator coupled to the housing, the release actuator to, when actuated, move the securing member out of the second opening to enable the rotating member to move back to the first position, wherein the housing includes a bore, the securing member disposed in and movable within the bore, and wherein, when the rotating member is in the second position, the second opening in the rotating member is aligned with the bore and, when the rotating member is in the first position, the second opening in the rotating member is not aligned with the bore.

14. The control device of claim 13, further including a biasing element disposed in the bore to bias the securing member toward the inner surface of the rotating member.

15. The control device of claim 13, wherein the rotating member includes a slot extending partially around a circumference of the rotating member and connected to the second opening, and wherein the release actuator includes a protrusion that extends through at least one of the slot or the second opening to engage the securing member.

16. The control device of claim 13, wherein the rotating member is rotatable about a first axis, and wherein the release actuator is moveable along a second axis that is perpendicular to the first axis.

17. A suspension system for a bicycle, the suspension system comprising:
 a suspension component operable between an unlocked state and a locked state;
 a cable coupled to the suspension component; and
 a control device to be coupled to a handlebar of the bicycle, the control device including:
  a housing to be coupled around the handlebar;
  a sleeve rotatably coupled to the housing, the sleeve having a first portion disposed within and rotatable within the housing, the sleeve having a second portion extending axially outward from a side of the housing, the first portion having a cable anchor hub, a cable wire of the cable coupled to the cable anchor hub, the sleeve rotatable between a first position and a second position to actuate the suspension component between the unlocked state and the locked state, respectively, by translating the cable wire;
  a gripping surface extending along an axial length of the second portion of the sleeve to enable a rider to grip and rotate the sleeve between the first position and the second position;
  a securing mechanism to lock the sleeve in the second position; and
  a release actuator configured to disengage the securing mechanism to enable the sleeve to rotate back to the first position.

18. The suspension system of claim 17, wherein the cable anchor hub includes a first cable attachment portion and a second cable attachment portion, the cable wire coupled to the first cable attachment portion.

19. The suspension system of claim 18, wherein the suspension component is a first suspension component and the cable is a first cable, further including a second suspension component coupled to the second suspension component, a cable wire of the second cable coupled to the second cable attachment portion, the sleeve, when rotated, to actuate the second suspension component between an unlocked state and a locked state.

20. The suspension system of claim 17, wherein the gripping surface is formed by a grip disposed on the second portion of the sleeve, the grip coupled to and rotatable with the sleeve between the first and second positions.

21. The suspension system of claim 17, wherein the second portion of the sleeve is at least two inches in length.

* * * * *